US012698432B2

(12) United States Patent
Pisklak et al.

(10) Patent No.: US 12,698,432 B2
(45) Date of Patent: Aug. 4, 2026

(54) COMPOSITION INCLUDING CURED GEOPOLYMER PARTICLES, AND METHODS OF MAKING AND USING THEREOF

(71) Applicant: Halliburton Energy Services, Inc., Houston, TX (US)

(72) Inventors: Thomas Jason Pisklak, Houston, TX (US); Heloisa Helena Fabricio Fernandes, Houston, TX (US); Ronnie Glen Morgan, Duncan, OK (US); Christopher Lynn Gordon, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/819,503

(22) Filed: Aug. 29, 2024

(65) Prior Publication Data

US 2026/0062603 A1 Mar. 5, 2026

(51) Int. Cl.
| | |
|---|---|
| *C09K 8/467* | (2006.01) |
| *C04B 14/04* | (2006.01) |
| *C04B 14/14* | (2006.01) |
| *C04B 20/02* | (2006.01) |
| *C04B 28/04* | (2006.01) |
| *C04B 40/00* | (2006.01) |
| *E21B 33/16* | (2006.01) |

(52) U.S. Cl.
CPC ............ *C09K 8/467* (2013.01); *C04B 14/044* (2013.01); *C04B 14/14* (2013.01); *C04B 20/026* (2013.01); *C04B 28/04* (2013.01); *C04B 40/0042* (2013.01); *E21B 33/16* (2013.01)

(58) Field of Classification Search
CPC ....... C09K 8/467; C04B 14/044; C04B 14/14; C04B 20/026; C04B 28/04; C04B 40/0042; E21B 33/16
See application file for complete search history.

(56) References Cited

U.S. PATENT DOCUMENTS

| | | | |
|---|---|---|---|
| 11,242,479 | B2 | 2/2022 | Pisklak et al. |
| 11,692,122 | B2 | 7/2023 | Pisklak et al. |
| 11,976,238 | B2 | 5/2024 | Pisklak et al. |
| 2013/0284070 | A1* | 10/2013 | Dubey .................... C04B 11/28 |
| | | | 106/695 |

(Continued)

FOREIGN PATENT DOCUMENTS

WO          2021188156 A1          9/2021

OTHER PUBLICATIONS

Foreign Communication from Related Application—International Search Report and Written Opinion of the International Searching Authority, International Application No. PCT/US2025/033468, dated Oct. 16, 2025, 9 pages.

(Continued)

*Primary Examiner* — Crystal J Lee
(74) *Attorney, Agent, or Firm* — Conley Rose, P.C.; Rodney B. Carroll

(57) ABSTRACT

A composition can include cured geopolymer particles and a particulate cementitious material. The cured geopolymer particles and the particulate cementitious material are a mixed blend. The composition also relates to methods of making and using thereof.

24 Claims, 6 Drawing Sheets

(56) References Cited

U.S. PATENT DOCUMENTS

| 2014/0048264 A1* | 2/2014 | Chatterji | ............... C04B 28/006 |
| | | | 166/292 |
| 2017/0183556 A1 | 6/2017 | Agapiou et al. | |
| 2019/0152853 A1 | 5/2019 | Turcinskas et al. | |
| 2020/0002594 A1 | 1/2020 | Ray et al. | |
| 2021/0253932 A1* | 8/2021 | Pisklak | .................. E21B 33/14 |
| 2021/0292230 A1* | 9/2021 | Alanqari | .................. C09K 8/46 |
| 2021/0355372 A1 | 11/2021 | Haque et al. | |
| 2024/0018047 A1* | 1/2024 | Tsirigotis | ............... B33Y 70/00 |

OTHER PUBLICATIONS

Sore et al., Effect of Portland Cement on Mechanical and Durability Properties of Geopolymer Concrete at Ambient Temperature, Civil Engineering Journal, 2023, pp. 1597-1609, vol. 9 No. 07.

* cited by examiner

10 ⸺
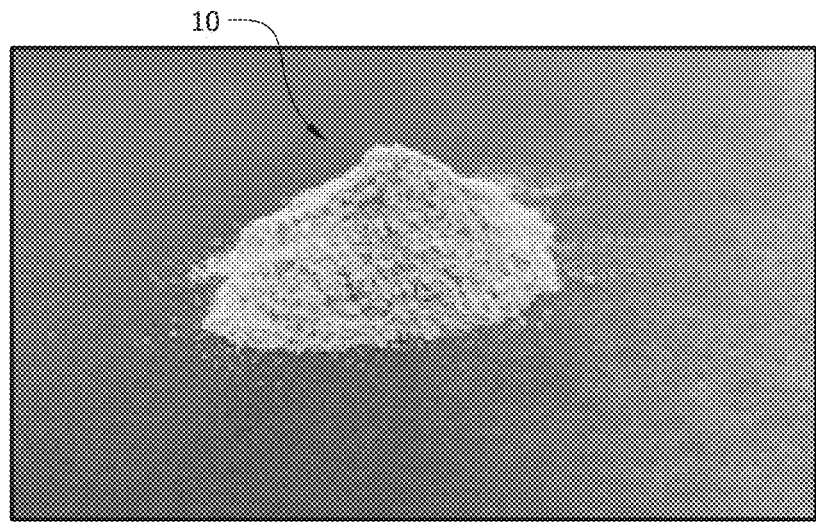
*FIG. 1*
10 ⸺
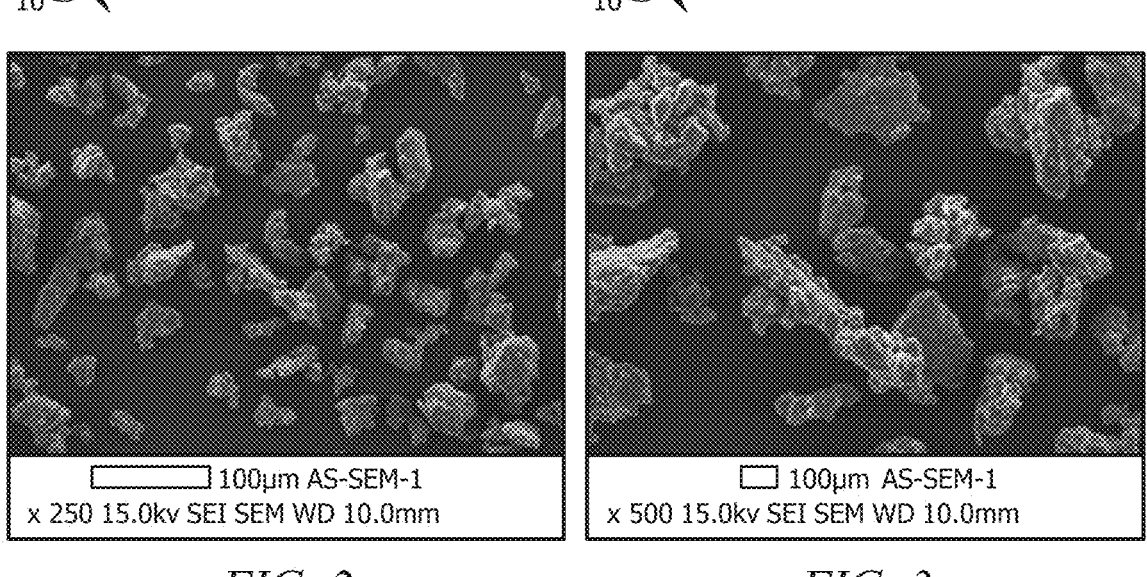
*FIG. 2*                      *FIG. 3*

10

COMPOSITION INCLUDING CURED GEOPOLYMER PARTICLES, AND METHODS OF MAKING AND USING THEREOF

FIELD

This application relates to a composition, and more specifically this application relates to a composition that can be used for recovering natural resources from a wellbore penetrating a subterranean formation.

BACKGROUND

This disclosure relates generally to a composition. More specifically, it relates to a composition and methods of making and using same for treating a wellbore penetrating a subterranean formation, for example, during a drilling operation and/or a cementing operation.

Natural resources such as gas, oil, and water residing in a subterranean formation are usually recovered by drilling a wellbore down to the subterranean formation while circulating a drilling fluid, also referred to as drilling mud, in the wellbore. After terminating circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing.

Generally, cementing operations are conducted after drilling, but in some circumstances a cementitious composition may be pumped as a fluid (e.g., in the form of a suspension or a slurry) into a desired location in the wellbore to remedy a lost circulation zone occurring during drilling operations. The term "lost circulation" refers to the total or partial loss of well bore fluids such as, but not limited to, drilling muds, spacers; cement slurries or water into highly permeable zones, cavernous formations, fractures or voids. Such openings may be naturally occurring or induced by pressure exerted during pumping operations. Lost circulation can be an expensive and time-consuming problem. In performing such a cementing operation, drilling can be stopped while a cementitious composition may be pumped as a fluid (e.g., in the form of a suspension or a slurry) into a desired location in the wellbore.

Low Portland cements used in cementing provide many advantages over conventional cements such as a lowered carbon footprint, a lowered permeability, a higher chemical resistance, and better mechanical properties. However, as the supplementary cementitious material (SCM) content of a low Portland cement is increased, the corresponding curing temperature also increases. Generally, when the SCM content reaches about 50 wt. % or more, and consequently the Portland cement content is less than about 50 wt. % of a dry blend, then the lower temperature limit for such slurries can increase to a temperature not be suitable for some drilling operations.

A broad variety of cement compositions have been used in subterranean cementing operations as subterranean formations vary and each generally have unique conditions and properties. As an example, temperatures may range to near freezing at an offshore pipe string prior to penetrating a subterranean formation where temperatures can exceed boiling temperatures. A cement formulation must be adapted to withstand these varied temperatures. Furthermore, there is a general desire for a cement formulation that is pumpable downhole, but then sets at a minimum amount time so operations can recommence. As such, there is an ongoing demand for cement compositions having properties suited for these varying conditions and having improved properties.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 1 is a pictorial depiction of a composition in accordance with some embodiments of the disclosure.

FIGS. 2-4 are depictions of scanning micrographs at different magnifications of a composition in accordance with some embodiments of the disclosure.

DETAILED DESCRIPTION

Figure 4:
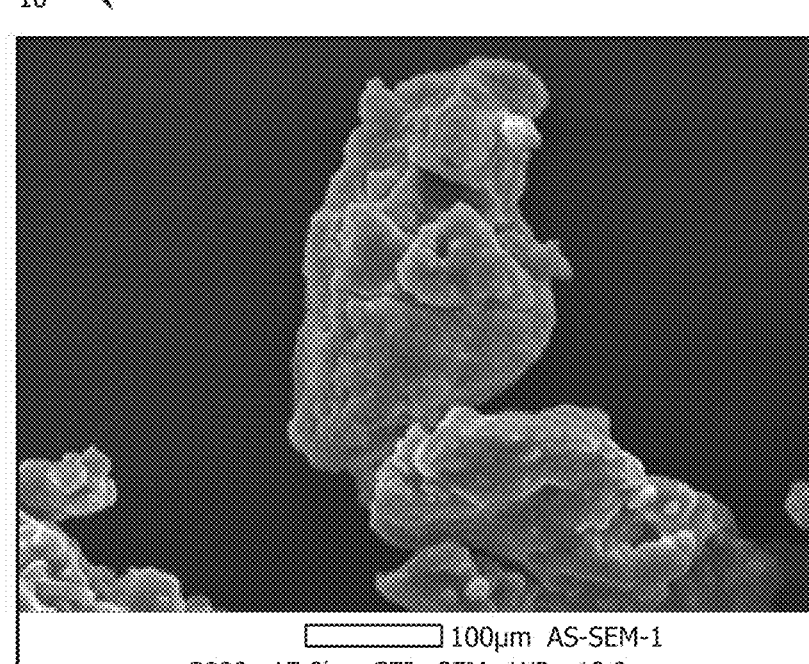

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down." For example, in a horizontal wellbore, two locations may be at the same level (i.e., depth within a subterranean formation), the location closer to the well surface (by comparing the lengths along the wellbore from the wellbore surface to the locations) is referred to as "above" the other location, the location farther away from the well surface (by comparing the lengths along the wellbore from the wellbore surface to the locations) is referred to as "below" or "lower than" the other location.

As used herein, a "particulate cementitious material" refers to a settable material that makes up a concrete mixture. In some embodiments, the particulate cementitious material includes a Portland cement. Portland cements that are suited for use in the disclosed composition include, but are not limited to, API Class A, C, G, H, low sulfate resistant cements, medium sulfate resistant cements, high sulfate resistant cements, other construction cements, or combinations thereof. The API class A, C, G, and H cements are classified according to API Specification 10. Additional examples of Portland cements suitable for use in the present disclose include, without limitation, those classified as ASTM Type I, II, III, IV, or V. In some embodiments, the particulate cementitious material includes a class C cement. In some embodiments, the particulate cementitious material includes a class G cement.

As used herein, the abbreviation "BWOB" means "by weight of blend" and indicates the amount, such as a percent (%) or a mass fraction, of a particulate material, such as cured geopolymer particles, compared to the total amount of particulate material including the cured geopolymer particles. If expressed as a percent, the abbreviation "% BWOB" may be used herein.

As used herein, the abbreviation "BWOB-ECGP" means "by weight of blend excluding cured geopolymer particles", such as an amount expressed as a percent (%) or a mass fraction. In this case, an amount of cured geopolymer particles can be compared to the total amount of particulate material excluding the amount of cured geopolymer particles, and the amount can be expressed as a percent or a mass fraction. If expressed as a percent, the abbreviation "% BWOB-ECGP" may be used herein.

As used herein, the term "weight percent" may be abbreviated "wt. %", degrees Fahrenheit may be abbreviated "° F.", degrees Celsius may be abbreviated "° C.", and pound per gallon may be abbreviated "ppg".

As used herein, the term "and/or" can mean one or more of items in any combination in a list, such as "A and/or B" means "A, B, or the combination of A and B".

The geopolymer particles of the present disclosure may be used in a variety of applications and environments, such as during drilling operations to plug a loss circulation zone and/or in cementing operations after drilling operations. A cement composition having the geopolymer particles as described herein can, in some embodiments, at least provide a lower set temperature, a quicker set time, a greater dynamic transport efficiency, an apparent viscosity, and better mixability. Including geopolymer particles in low Portland cement formulations at concentrations as low as 1% BWOB accelerates the curing of the cement enough to allow usage at temperatures as low as 80° F. and possibly lower. Combining the geopolymer and Portland cement as dry blends greatly enhances strength development, decreases the lower temperature usage limit, and increases the operational range of blended low Portland cement with cured geopolymer particles.

In some embodiments, a geopolymer particle can be formed by contacting an aluminosilicate, a metal hydroxide, a metal silicate, and an aqueous fluid. In certain embodiments, the aluminosilicate source may include any suitable aluminosilicate. In some embodiments, the aluminosilicate may be a mineral including aluminum, silicon, and oxygen, plus counter-cations. In one or more embodiments, the aluminosilicate source may be chosen based at least in part on the specific properties of the aluminosilicate. For example, some minerals such as andalusite, kyanite, and sillimanite are naturally occurring aluminosilicate sources that have the same composition, $Al_2SiO_5$, but differ in crystal structure. The differences in the crystal structure of the aluminosilicate may provide different properties. For example, each of andalusite, kyanite, or sillimanite may react more or less quickly and to different extents at the same temperature and pressure due to the differing crystal structures. Moreover, aluminosilicates, including amorphous materials, with varying ratios of aluminum and silicon can also affect final geopolymer properties. Other species, such as calcium, sodium, etc. contained in the mineral may also affect final properties. In certain embodiments, amorphous aluminosilicates can also be effective at forming geopolymers. In some embodiments, the final geopolymer created from any one aluminosilicate may have both microscopic and macroscopic differences such as mechanical strength and thermal resistivity owing to the different aluminosilicate sources. In some embodiments, the aluminosilicate source may include, but is not limited to, metakaolin clays, calcined clays, partially calcined clays, kaolinite clays, lateritic clays, illite clays, volcanic rocks, mine tailings, blast furnace slag, and coal fly ash. In one or more embodiments, the aluminosilicate includes metakaolin.

Generally, the metal hydroxide can include lithium hydroxide, sodium hydroxide, potassium hydroxide, or any combination thereof, preferably sodium hydroxide. In some embodiments, the metal silicate source may include any suitable metal silicate. A silicate may be any compound containing an anionic silicon compound. In some embodiments, the silicate may include an orthosilicate anion also known as silicon tetroxide anion $(SiO_4)_4$ or a hexafluorosilicate $(SiF_6)_2$. In other embodiments, the silicate may include cyclic and single chain silicates which may have the general formula $(SiO_3^{2-})_n$ and sheet-forming silicates which may have the general formula $(Si_2O_5^{2-})_n$. In one or more embodiments, the silicate may have one or more metal cations associated with each silicate molecule. In some embodiments, suitable metal silicate sources and may include, but are not limited to, lithium silicate, sodium silicate, magnesium silicate, and potassium silicate, preferably sodium silicate. Typically, the aqueous fluid includes fresh water, salt water, brine, a produced water, a surface water, or any combination thereof, preferably fresh water.

In some embodiments, contacting can further include contacting the metal hydroxide and the aqueous fluid and mixing at about 100 to about 1,000 revolutions per minute (rpm), about 200 to about 800 rpm, about 400 rpm to about 600 rpm, about 450 to about 550 rpm, or about 500 rpm to form a first solution, and an initial curing the first solution at about 10° C. to about 30° C., about 15° C. to about 25° C., or about 20° C. to about 22° C. Sometimes, contacting further includes contacting the first solution with a metal silicate to form a second solution and cooling to the second solution at about 10° C. to about 30° C., about 15° C. to about 25° C., or about 20° C. to about 22° C. In some embodiments, contacting can further include contacting the aluminosilicate and mixing at about 1,000 to about 2,000 revolutions per minute (rpm), about 1,200 rpm to about 1,800 rpm, about 1,400 to about 1,600 rpm, about 1,450 to about 1,550 rpm, or about 1,500 rpm, for about 10 seconds to about 600 seconds, about 30 seconds to about 300 seconds, about 50 seconds to about 200 seconds, about 100 seconds to about 140 seconds, or about 120 seconds. In certain embodiments, the contacted mixture can be considered a precursor, and is not calcined. After contacting, the mixture can be sealed.

After sealing, curing the mixture can be conducted at about 100° C. to about 600° C., about 110° C. to about 500° C., about 120° C. to about 180° C., about 130° C. to about 160° C., or about 140° C. for at least about 24 hour (hr), at least about 48 hr, at least about 72 hr, about 24 hr to about 168 hr, or about 24 hr to about 120 hr, to obtain the geopolymer which is cured. Generally, the geopolymer particle comprises a cured geopolymer particle.

In certain embodiments, each of the cured geopolymer particles includes an aluminosilicate; a metal hydroxide; and a metal silicate. The metal hydroxide comprises sodium hydroxide and the metal silicate comprises sodium silicate. The cured geopolymer particles are not calcined. Each of the cured geopolymer particles is made by contacting an aluminosilicate, a metal hydroxide, a metal silicate, and water to form a mixture; curing the mixture at about 140° C. to about 600° C. for at least about 48 hours to obtain a cured geopolymer, and reducing a size of the cured geopolymer to obtain cured geopolymer particles, such as grinding the cured geopolymer to obtain cured geopolymer particles, which can be optional in some embodiments. Reducing the size of the cured geopolymer can be accomplished by using one process, or a combination of processes. In some embodiments, reducing a size of the cured geopolymer can be accomplished by grinding, milling, pulverizing, crushing, comminuting, shredding, fragmenting, disintegrating, chopping, granulating, high-pressure homogenizing, spray drying, ultrasonicating, cryogenic milling, wet milling, micronizing, or a combination thereof.

Generally, grinding reduces material to smaller particles by crushing or milling; and milling is a mechanical process to grind, crush, or pulverize material into fine particles, with different types of milling such as ball milling, jet milling, and hammer milling. Also, pulverizing can include breaking down material into fine particles or powder, and crushing can include applying a force to break down large pieces into smaller fragments or particles. Moreover, comminuting is generally a process of reducing material to smaller particles, which can include grinding, milling, and crushing, and shredding is generally cutting or tearing material into smaller pieces or strips. Furthermore, fragmenting can include breaking material into smaller pieces, often used in the context of explosives or mechanical forces, and disintegrating can be a process of breaking down material into smaller parts or particles, often by physical means. Additionally, chopping generally includes cutting material into smaller pieces, sometimes used in food processing or wood preparation, and granulating generally includes forming larger particles into smaller granules, often through mechanical means. Also, high-pressure homogenizing can include forcing a liquid through a narrow space at high pressure, causing particles to break apart, and spray drying can include spraying a liquid into a hot drying medium, causing the liquid to evaporate and leaving behind fine particles. Moreover, ultrasonicating generally uses high-frequency sound waves to agitate particles in a liquid, causing them to collide and break apart, and cryogenic milling generally includes cooling materials to very low temperatures using liquid nitrogen before milling. Furthermore, wet milling can include milling particles in a liquid medium, which can help reduce particle size more effectively and prevent agglomeration, and micronizing can include using uses high-velocity air or steam to reduce particle size, often to the micron or sub-micron level. These processes for reducing the size of the cured geopolymer are merely exemplary and are not exclusive.

Although not wanting to be bound by theory, the main geopolymer polymerization reaction is a condensation reaction where water is expelled. However, there can also be "mix water" present before, during and after curing, typically in pore spaces of the particles. In some embodiments, a process, such as "drum drying", for curing followed by compression with parallel roller mills can create geopolymer particles on a commercial scale. Alternatively, fluidized bed drying can also be used.

Sometimes, the cured geopolymer particles include an aluminosilicate with a molar ratio of $SiO_2$ to $Al_2O_3$ of about 5.0:1.0 to about 1.0:2.0; about 2.5:1.0 to about 1.0:2.0, or about 2.2:1.0 to about 1.0:1.0. In certain embodiments, a geopolymer particle, can include, by weight percent (wt. %) based on oxide about 40 to about 80, about 50 to about 70, about 55 to about 65, about 60 to about 62, about 60 to about 61, or about 60.45 $SiO_2$; about 10 to about 50, about 20 to about 45, about 30 to about 40, about 33 to about 37, about 35 to about 36, or about 35.65 $Al_2O_3$; about 0.1 to about 4, about 1 to about 3, about 1.2 to about 2, about 1.6 to about 1.7, or about 1.66 $TiO_2$; about 0.1 to about 2, about 0.5 to about 1.5, about 0.9 to about 1.1, about 1.0 to about 1.1, or about 1.01 $Fe_2O_3$; about 0.5 to about 1.0, about 0.6 to about 0.9, about 0.75 to about 0.85, or about 0.79 I; about 0.1 to about 0.3, about 0.13 to about 0.2, or about 0.16 CaO; about 0.05 to about 0.15, about 0.08 to about 0.10, or about 0.09 $K_2O$; about 0.04 to about 0.08, about 0.05 to about 0.07, or about 0.06 $Cs_2O$; about 0.03 to about 0.07, about 0.04 to about 0.06, or about 0.05 $ZrO_2$; about 0.01 to about 0.05, about 0.02 to about 0.04, or about 0.03 $P_2O_5$; about 0.01 to about 0.03, or about 0.02 $Cr_2O_3$; and about 0.01 to about 0.03, or about 0.02 $Ir_2O_3$. In certain embodiments, some geopolymer particles can be obtained from recycling and reducing a size of a geopolymer.

In some embodiments, the cured geopolymer particles have a $D_{50}$ particle size of about 1 micron ($\mu$m) to about 1,000 $\mu$m, about 10 $\mu$m to about 800 $\mu$m, about 20 $\mu$m to about 700 $\mu$m, about 30 $\mu$m to about 600 $\mu$m, about 30 $\mu$m to about 500 $\mu$m, about 30 $\mu$m to about 300 $\mu$m, about 30 $\mu$m to about 200 $\mu$m, about 80 $\mu$m to about 180 $\mu$m, about 120 $\mu$m to about 160 $\mu$m, or about 162 $\mu$m. In certain embodiments, the cured geopolymer particles have a $D_{10}$ particle size of about 1 $\mu$m to about 100 $\mu$m, about 10 $\mu$m to about 80 $\mu$m, about 20 $\mu$m to about 60 $\mu$m, about 30 $\mu$m to about 40 $\mu$m, or about 33.9 $\mu$m. In one or more embodiments, the cured geopolymer particles have a $D_{90}$ particle size of 100 $\mu$m to about 1,000 $\mu$m, about 200 $\mu$m to about 900 $\mu$m, about 300 $\mu$m to about 700 $\mu$m, about 400 $\mu$m to about 600 $\mu$m, about 450 $\mu$m to about 550 $\mu$m, or about 474 $\mu$m. In certain embodiments, the cured geopolymer particles can have a particle size of about 0.1 nanometer (nm) to about 1,000 nm, 0.1 nm to about 100 nm, about 1 to about 100 nm, about 5 to about 100 nm, about 10 to about 100 nm, about 10 to about 20 nm, about 20 to about 30 nm, about 30 nm to about 40 nm, about 40 nm to about 50 nm, about 50 nm to about 60 nm, about 60 nm to about 70 nm, about 70 to about 80 nm, about 80 nm to about 90 nm, or about 90 nm to about 100 nm. In some embodiments, the cured geopolymer particles have a particle size of about 1 micron ($\mu$m) to about 1,000 $\mu$m, about 1 $\mu$m to about 600 $\mu$m, about 1 $\mu$m to about 100 $\mu$m, about 3 $\mu$m to about 100 $\mu$m, about 5 $\mu$m to about 100 $\mu$m, about 8 $\mu$m to about 100 $\mu$m, about 10 $\mu$m to about 100 $\mu$m, about 15 $\mu$m to about 50 $\mu$m, about 10 $\mu$m to about 20 $\mu$m, about 20 $\mu$m to about 30 $\mu$m, about 30 $\mu$m to about 40 $\mu$m, about 40 $\mu$m to about 50 $\mu$m, about 50 $\mu$m to about 60 μm, about 60 μm to about 70 μm, about 70 μm to about 80 μm, about 80 μm to about 90 μm, or about 90 μm to about 100 μm.

Referring to FIGS. 1-4, exemplary cured geopolymer particles 10 can have a $D_{50}$ particle size of about 158 microns corresponding to approximately 40 mesh as shown in FIG. 1. Referring to FIGS. 2-4, the cured geopolymer particles 10 are depicted at various enlargements with a scanning electron micrograph. In some embodiments, the cured geopolymer particles can have a specific gravity of about 2.18.

The geopolymer particles can be subjected to x-ray fluorescence (XRF) to provide the following data:

TABLE 1

| Oxides, wt. % as determined by XRF | Geopolymer Particles |
| --- | --- |
| $SiO_2$ | 60.45 |
| $Al_2O_3$ | 35.65 |
| $TiO_2$ | 1.66 |
| $Fe_2O_3$ | 1.01 |
| I | 0.79 |
| CaO | 0.16 |
| $K_2O$ | 0.09 |
| $Cs_2O$ | 0.06 |
| $ZrO_2$ | 0.05 |
| $P_2O_5$ | 0.03 |
| $Cr_2O_3$ | 0.02 |
| $Ir_2O_3$ | 0.02 |

As an example, cured geopolymer particles can generally have a particle size distribution (PSD) of:

TABLE 2

| PSD | $D_{10}$ μm | $D_{50}$ μm | $D_{90}$ μm |
| --- | --- | --- | --- |
| Geopolymer Particles | 33.9 | 158 | 474 |

In some embodiments, a composition can include cured geopolymer particles and a particulate cementitious material. Sometimes, the cured geopolymer particles and the particulate cementitious material are a mixed blend.

In certain embodiments, the particulate cementitious material can include an additional pozzolanic material, in addition to the metakaolin in the cured geopolymer particles, selected from the group consisting of Trass flour, recycled glass, fly ash, bottom ash, cenospheres, glass bubbles, slag, clays, calcined clays, partially calcined clays, kaolinite clays, lateritic clays, illite clays, crystalline silica, silica flour, cement kiln dust, volcanic rock, natural pozzolans, mine tailings, diatomaceous earth, zeolite, shale, ground vitrified pipe, agricultural waste ash, ground granulated blast furnace slag, bentonite, pumice, and any combination thereof. In some embodiments, the particulate cementitious material can include an additive selected from the group consisting of a quartz flour, a bulk flow enhancer, an aggregate, a particulate material, a filler, and any combination thereof.

In certain embodiments, the particulate cementitious material comprises a Portland cement, a volcanic rock, a fly ash, or any combination thereof. In some embodiments, the composition is a low Portland cement blend, sometimes including less than about 50 percent, by weight, Portland cement.

In some embodiments, the composition, optionally comprising a dry blend, has a moisture content less than about 1,000 parts per million by weight (ppmw), about 900 ppmw, about 800 ppmw, about 700 ppmw, about 600 ppmw, about 500 ppmw, about 400 ppmw, about 300 ppmw, about 200 ppmw, about 100 ppmw, about 10 ppmw, about 1 ppmw, or about 0.1 ppmw of water. Generally, the cured geopolymer particles can comprise about 1 weight percent (wt. %) to about 70 wt. %, 5 weight percent to about 70 wt. %, about 10 wt. % to about 60 wt. %, about 10 wt. % to about 50 wt. %, about 20 wt. % to about 50 wt. %, about 30 wt. % to about 50 wt. %, about 40 wt. % to about 50 wt. %, about 41 wt. % to about 50 wt. %, about 42 wt. % to about 50 wt. %, about 43 wt. % to about 50 wt. %, about 44 wt. % to about 50 wt. %, about 45 wt. % to about 50 wt. %, about 46 wt. % to about 50 wt. %, about 47 wt. % to about 50 wt. %, about 48 wt. % to about 50 wt. %, about 49 wt. % to about 50 wt. %, about 49 wt. % to about 51 wt. %, about 49 wt. % to about 52 wt. %, about 49 wt. % to about 53 wt. %, about 49 wt. % to about 54 wt. %, or about 49 wt. % to about 55 wt. %, based on the total weight of the composition.

In some embodiments, the method of making a mixed particulate blend, can include contacting cured geopolymer particles and a particulate cementitious material to form the mixed particulate blend. The particulate cementitious material can include a Portland cement, and the cured geopolymer particles, as discussed herein.

In certain embodiments, a wellbore servicing fluid can include the composition including cured geopolymer particles, and a particulate cementitious material. Sometimes, the cured geopolymer particles and the particulate cementitious material are a mixed blend, and an aqueous fluid. The wellbore servicing fluid can include about 10% to about 110%, about 10% to about 100%, about 20% to about 100%, about 30% to about 100%, about 40% to about 100%, about 50% to about 100%, about 60% to about 100%, about 70% to about 100%, about 80% to about 100%, or about 90% to about 100% cured geopolymer particles by weight of the blend (BWOB-ECGP). Generally, the aqueous fluid may be from any source, provided that it does not contain an amount of components that may undesirably affect the other components in the composition. For example, the aqueous fluid can be selected from a group consisting essentially of fresh water, surface water, ground water, produced water, sea water, salt water, brine (e.g., underground natural brine, formulated brine, etc.), and combinations thereof. A formulated brine may be produced by dissolving one or more soluble salts in water, a natural brine, or sea water. Representative soluble salts include the chloride, bromide, acetate, and formate salts of potassium, sodium, calcium, magnesium, and zinc. The aqueous fluid can be present in the composition in an amount effective to provide a slurry having desired (e.g., job or service specific) rheological properties. In embodiments, the aqueous fluid is present in the composition in an amount effective to form a pumpable slurry of the composition. As such, the aqueous fluid can include fresh water, salt water, brine, a produced water, a surface water, or any combination thereof.

In certain embodiments, the wellbore servicing fluid further includes a suspension agent. The suspension agent comprises a crosslinked guar, monoethylene glycol (MEG), a viscosifier, or any combination thereof. In some embodiments, the composition further includes silica fume. In some embodiments, the silica fume is a component of the cement blend. The silica fume can be present in the composition in an amount of from about 0.5% BWOB to about 50% BWOB based on the total weight of the cement blend. Alternatively, the silica fume can be present in the composition in an amount of from about 0.5% BWOB to about 40% BWOB, alternatively from about 1% BWOB to about 30% BWOB, alternatively from about 1% BWOB to about 20% BWOB, or alternatively from about 1% BWOB to about 10% BWOB. The silica fume can also be included in the composition in the form of a liquid, in such embodiments the silica fume is added to a fluid (e.g., the liquid phase) of the composition instead of being a part of the cement blend. In some embodiments, the silica fume is in forms of both a solid and a liquid, and is added to the cement blend and the fluid, respectively.

In embodiments, the composition further comprises a sodium chloride and sodium sulfate blend. The sodium chloride and sodium sulfate blend can operate as an accelerator. The sodium chloride can be present in the composition in an amount ranging from about 0.01% BWOB to about 10% BWOB based on the total weight of the cement blend. Alternatively, the sodium chloride can be present in the composition in an amount of from about 0.01% BWOB to about 8% BWOB, alternatively from about 0.1% BWOB to about 6% BWOB, alternatively from about 0.1% BWOB to about 5% BWOB, or alternatively from about 0.1% BWOB to about 1% BWOB. The sodium sulfate can be present in the composition in an amount ranging from about 0.01% BWOB to about 10% BWOB based on the total weight of the cement blend. Alternatively, the sodium sulfate can be present in the composition in an amount of from about 0.01% BWOB to about 8% BWOB, alternatively from about 0.1% BWOB to about 6% BWOB, alternatively from about 0.1% BWOB to about 5% BWOB, or alternatively from about 0.1% BWOB to about 1% BWOB. In one or more embodiments, a molar ratio of sodium chloride to sodium sulfate in the composition is in a range of from about 1:10 to about 10:1, alternatively from about 1:5 to about 5:1, or alternatively from about 1:2 to about 2:1. In some embodiments, the sodium chloride and sodium sulfate blend can be added in the form of a liquid.

In some embodiments, the composition excludes an expansion additive. In other embodiments the composition includes an expansion additive. For example, an expansion additive can be present in the composition in an amount of equal to or less than about 10% BWOB based on the total weight of the cement blend, alternatively equal to or less than about 5% BWOB, alternatively from about 0.5% BWOB to about 4% BWOB, or alternatively equal to or less than about 0.001% BWOB.

In embodiments, the composition further comprises a pre-blended stabilizing agent. The pre-blended stabilizing agent can comprise bentonite, sepiolite, attapulgite, water swellable synthetic clays, diutan gum, xanthan gum, wellan gum, guar gum, modified guar gum, hydroxy ethyl cellulose, modified cellulose, other classes of polysaccharides, or combinations thereof. In embodiments, the pre-blended stabilizing agent is prepared before making the composition. The pre-blended stabilizing agent can be present in the composition in an amount ranging from about 0.01% BWOB to about 10% BWOB based on the total weight of the cement blend, alternatively from about 0.05% BWOB to about 6% BWOB, or alternatively from about 0.1% BWOB to about 3% BWOB. The stabilizing agent can be added in a form of liquid or powder.

In some embodiments, the composition further comprises limestone. In such embodiments, the limestone is a component of the cement blend. Limestone is a type of carbonate sedimentary rock. Limestone can be composed mostly of minerals calcite and aragonite, which are different crystal forms of calcium carbonate. In one or more embodiments, limestone is present in the composition in an amount ranging from about 0.01% BWOB to about 90% BWOB based on the total weight of the cement blend, alternatively from about 0.05% BWOB to about 50% BWOB, or alternatively from about 0.1% BWOB to about 30% BWOB.

In some embodiments, the composition further comprises one or more additives. The one or more additives can comprise weighting agents, retarders, accelerators, activators, gas migration control additives, lightweight additives, gas-generating additives, mechanical-property-enhancing additives (e.g., carbon fibers, glass fibers, metal fibers, minerals fibers, polymeric elastomers, latexes, etc.), lost-circulation materials, filtration-control additives, fluid-loss-control additives, defoaming agents, foaming agents, transition time modifiers, dispersants, thixotropic additives, suspending agents, or combinations thereof. One having ordinary skill in the art, with the benefit of this disclosure, should be able to select one or more appropriate additives for a particular application. The one or more additives can be present in the composition in an amount ranging from about 0.01% BWOB to about 50% BWOB based on the total weight of the cement blend, alternatively from about 0.05% BWOB to about 40% BWOB, alternatively from about 0.1% BWOB to about 30% BWOB, alternatively from about 1% BWOB to about 20% BWOB, or alternatively from about 1% BWOB to about 10% BWOB.

The composition disclosed herein can have any suitable density, including, but not limited to, in a range of from about 500 kg/m$^3$ to about 3,000 kg/m$^3$, alternatively from about 800 kg/m$^3$ to about 2,800 kg/m$^3$, alternatively from about 1,200 kg/m$^3$ to about 2,800 kg/m$^3$, alternatively from about 1,200 kg/m$^3$ to about 2,600 kg/m$^3$, or alternatively from about 1,300 kg/m$^3$ to about 2,100 kg/m$^3$.

One attribute of the composition is its suitability for mixing. Generally, the composition is mixable with suitable viscosity at various conditions, such as blend rates. Sometimes, the wellbore servicing fluid has a mixability or an apparent viscosity of less than about 1,500 cP, or less than about 1,400 cP, as measured by a Fann® Model RheoVADR with FYSA attachment in accordance with test standard API-RP-10B-2.

In addition, the composition of the disclosure has suitability for use in a wide variety of applications. As an example, during some operations a casing or conduit may be offset in a wellbore creating "slim hole" conditions. In such situations, a wellbore servicing fluid requires stability over a wide range of shear rates for transporting materials, such as lost circulation materials, to locations in the wellbore. Generally, the wellbore servicing fluid has a dynamic transport efficiency or an apparent viscosity of about 200 cP to about 400 cP as measured by a Fann® Model Rheo VADR with FYSA attachment in accordance with test standard API-RP-10B-2 attachment, at a shear rate of about 50 to about 1,200 per second in a substantially laminar flow for transporting, e.g., loss circulation materials.

In some embodiments, a method for making a wellbore servicing fluid can include contacting cured geopolymer particles and a particulate cementitious material to form a composition, optionally comprising a dry blend. The method can further include contacting the composition with an aqueous fluid to form a wellbore servicing fluid. Generally, the aqueous fluid may include fresh water, salt water, brine, a produced water, a surface water, or any combination thereof.

In certain embodiments, the contacting the composition with an aqueous fluid can further include blending at about 1,000 rpm to about 20,000 rpm, about 2,000 rpm to about 15,000 rpm, or about 4,000 rpm to about 12,000 rpm for about 10 to about 60 seconds. Sometimes, the method can further include conditioning at about 4° C. to about 50° C., about 16° C. to about 38° C., or about 27° C. (80° F.) for about 1 minute (min) to about 60 min, about 20 min to about 40 min, or about 30 min. Sometimes, the wellbore servicing fluid can include about 10% to about 110%, about 10% to about 100%, about 20% to about 100%, about 30% to about 100%, about 40% to about 100%, about 50% to about 100%, about 60% to about 100%, about 70% to about 100%, about 80% to about 100%, or about 90% to about 100% cured geopolymer particles BWOB-ECGP.

In some embodiments, the method can further include allowing the wellbore servicing fluid to set to form concrete, wherein the wellbore servicing fluid sets in about 35%, about 30%, or about 25% less time than an otherwise identical wellbore servicing fluid absent the cured geopolymer particles at a set time of about 50 pounds per square inch "psi", about 200 psi, about 250 psi, or about 500 psi, as measured for compressive strength by an ultrasonic cement analyzer (UCA). The set time can be at about 12 hours, about 24 hours, about 36 hours, about 48 hours, about 60 hours, about 72 hours, about 120 hours, or about 168 hours. The wellbore servicing fluid can set in about 30 hours at about 250 psi. Generally, the wellbore servicing fluid sets at a bottom hole static temperature of about 10° C. to about 60° C. (140° F.), about 10° C. to about 55° C., about 10° C. to about 50° C., about 10° C. to about 45° C., or about 10° C. to about 40° C.

In certain embodiments, a wellbore servicing fluid can include cured geopolymer particles; a particulate cementitious material; and an aqueous fluid. Generally, the particulate cementitious material comprises a Portland cement. In some embodiments, the cured geopolymer particles comprise about 1 wt. % to about 70 wt. %, 5 weight percent to about 70 wt. %, about 10 wt. % to about 60 wt. %, about 10 wt. % to about 50 wt. %, about 20 wt. % to about 50 wt. %, about 30 wt. % to about 50 wt. %, about 40 wt. % to about 50 wt. %, about 41 wt. % to about 50 wt. %, about 42 wt. % to about 50 wt. %, about 43 wt. % to about 50 wt. %, about 44 wt. % to about 50 wt. %, about 45 wt. % to about 50 wt. %, about 46 wt. % to about 50 wt. %, about 47 wt. % to about 50 wt. %, about 48 wt. % to about 50 wt. %, about 49 wt. % to about 50 wt. %, about 49 wt. % to about 51 wt. %, about 49 wt. % to about 52 wt. %, about 49 wt. % to about 53 wt. %, about 49 wt. % to about 54 wt. %, or about 49 wt. % to about 55 wt. %, based on the total weight of the mixed blend.

In certain embodiments, a method of servicing a wellbore penetrating a subterranean formation can include placing a wellbore servicing fluid as described herein into the wellbore; and allowing the wellbore servicing fluid to form a set cement or concrete. Generally, the method can further include placing a first spacer fluid downhole of the wellbore servicing fluid and a second spacer fluid uphole of the wellbore servicing fluid. Sometimes, the first spacer fluid, the wellbore servicing fluid and the second spacer fluid can be placed downhole during drilling to remedy a lost circulation zone. The wellbore servicing fluid may include lost circulation materials.

In some embodiments, lost circulation materials may be included in the compositions to cure the fluid losses without altering the thixotropic behavior of the wellbore servicing fluid prior to providing cement downhole. In certain embodiments, lost circulation materials may include, but are not limited to, resilient graphitic carbon, ground walnut shells, calcium carbonate and polymers, polymer flakes, cellophane flakes, melamine flakes, ground coal, calcium carbonate, and any combination thereof.

In certain embodiments, a surfactant may be used with the lost circulation material. The surfactant may, among other purposes, help disperse the lost circulation materials and/or other additives in a wellbore servicing fluid or a treatment fluid. A suitable surfactant may include an alkoxylated alkyl alcohol and salts thereof, an alkoxylated alkyl phenol and salts thereof, an alkyl or aryl sulfonate, a sulfate, a phosphate, a carboxylate, a polyoxyalkyl glycol, a fatty alcohol, a polyoxyethylene glycol sorbitan alkyl ester, a sorbitan alkyl ester, a polysorbate, a glucoside, a quaternary amine compound, an amine oxide surfactant, or any combination thereof.

In certain embodiments, the lost circulation materials may include a plurality of fibers. Examples of synthetic fibers suitable for certain embodiments of the present disclosure include, but are not limited to, polymers or copolymers composed of polypropylene, polyaramid, polyester, polyacrylonitrile, and polyvinyl alcohol. Examples of biodegradable fibers include, but are not limited to, fibers composed of modified cellulose, chitosan, soya, modified chitosan, polycaprolactone, polylactic acid, poly (3-hydroxybutyrate), polyhydroxy-alkanoates, polyglycolic acid ("PGA"), polylactic acid ("PLA"), polyorthoesters, polycarbonates, polyaspartic acid, polyphosphoesters, soya, or copolymers thereof. Examples of natural fibers suitable for certain embodiments of the present disclosure include, but are not limited to, fibers of cellulose including viscose cellulosic fibers, oil coated cellulosic fibers, and fibers derived from a plant product like paper fibers. Examples of other suitable fibers include, but are not limited to, carbon including carbon fibers; melt-processed inorganic fibers including basalt fibers, wollastonite fibers, non-amorphous metallic fibers, ceramic fibers, glass fibers, and other mineral fibers. The fibers also may be a composite fiber made from any combination of the preceding materials. In certain embodiments, the fibers may have a length to diameter aspect ratio in the range of about 2:1 to about 5,000:1. In certain embodiments, these lost circulation materials may be fibrous materials, such as shredded automobile tires or sawdust. In other embodiments, these lost circulation materials may be flaky materials, such as wood chips and mica flakes. In still other embodiments, these additional lost circulation materials may be granular materials, such as ground nutshells, ground rubber, formica, ground coal, and plastics.

In some embodiments, the lost circulation materials may have a specific gravity in the range of from about 0.7 to about 4.0. In some embodiments, the lost circulation materials may have a hardness (Brinell value) in the range of from about 0.1 to about 500. In some embodiments, the lost circulation materials may have a Brinell value in the range of from about 0.1 to about 10. In other embodiments, the lost circulation materials may have a Brinell value in the range of from about 10.1 to about 200. In still other embodiments, the additional lost circulation materials may have a Brinell value in the range of from about 201 to about 500. In certain embodiments, the lost circulation materials may have geometries ranging from: spheres, ellipsoids, platelets, flakes, and fibers.

Usually, the first spacer fluid, the wellbore servicing fluid and the second spacer fluid are placed downhole after drilling for cementing a tubular in the wellbore. In some embodiments, a method of drilling a wellbore can include preparing a wellbore servicing fluid by contacting cured geopolymer particles and a particulate cementitious material with an aqueous fluid. Sometimes, the method can further include drilling, with a drilling fluid, at least a portion of the wellbore penetrating a subterranean formation, placing a first spacer fluid downhole, placing the wellbore servicing fluid downhole, and placing a second spacer fluid downhole. Generally, the method can also include moving a drill string uphole within the wellbore, allowing a sufficient period of time for the wellbore servicing fluid to set, and moving the drill string downhole within the wellbore for continuing drilling.

In certain embodiments, a method can include preparing a wellbore servicing fluid by contacting cured geopolymer particles and a particulate cementitious material with an aqueous fluid. Sometimes after drilling, the wellbore servicing fluid can be placed in a wellbore penetrating a subterranean formation, and allowing the wellbore servicing fluid to set. Generally, the wellbore servicing fluid is placed in an annular space formed by a conduit (e.g., casing) disposed within the wellbore.

The main function of a spacer fluid or spacer is to perform a thorough displacement of the preceding fluid, such as a drilling fluid. Drilling fluid displacement may be compromised by effects such as interface mixing, fluid channeling and buoyancy. Mixing of fluids at an interface is encouraged when the flowing fluid has a lower density and is moving in turbulent flow. The effectiveness of the spacer may be maximized by viscosifying the fluid and increasing its density above that of the active fluid. The spacer can be weighted up with the same agent used in the drilling fluid, or alternatively the spacer may be an aqueous based fluid and weighted accordingly (e.g., a brine based push pill). The degree to which the viscosity and the density are increased depends on the deviation of the well. The viscosity of the spacer encourages laminar flow, which minimizes the tendency for channeling, minimizes mixing at the interface and slows down any fluid migration due to buoyancy effects. Increasing the density of the spacer ensures that it is not buoyant in the drilling fluid and prevents channeling in deviated sections of the well. The spacer can include any suitable material, such as a polysaccharide; a viscosifier, such as a synthetic polymer or a mineral; and a carrier fluid including an aqueous fluid.

Compressive strength is generally the capacity of a material or structure to withstand axially directed compression forces. The compressive strength of a composition can be measured at a specified time (e.g., 24 hours) after a cement blend has been mixed with water and the resultant cement slurry is maintained under specified temperature and pressure conditions to form a hardened, set cement. For example, compressive strength can be measured at a time in the range of from about 12 to about 168 hours (or longer) after the cement slurry is mixed, and the cement slurry is maintained typically at a temperature of from 0° C./32° F. to about 204° C./400° F. and a suitable pressure, during which time the cement slurry can set into a hardened mass. Compressive strength can be measured by either a destructive method or non-destructive method. The destructive method physically tests the strength of hardened samples at various points in time by crushing the samples in a compression-testing machine. The compressive strength is calculated from the failure load divided by the cross-sectional area resisting the load and is reported in units of pound-force per square inch (psi). Non-destructive methods can employ an ultrasonic cement analyzer (UCA). A UCA can be available from Fann® Instrument Company, Houston, TX. Compressive strengths can be determined in accordance with API RP 10B-2, *Recommended Practice for Testing Well Cements*, First Edition, July 2005.

In one or more embodiments, the composition has a time to reach 50 psi (345 kPa) compressive strength (also referred to as "time to reach 50 psi") measured in a UCA test in accordance with test standard API-RP-10B-2. The time to reach 50 psi under static conditions in a UCA can be used as an estimation of the initial set time of a composition. The time to reach 50 psi can be the time it takes for a cement slurry to transition from a pumpable fluid state to a hardened set state. Other pressures may also be used, such as 100 psi, 150 psi, 200 psi, 250 psi, and 500 psi.

In certain embodiments, the composition has a time to reach 50 psi compressive strength in a range of from about 2.0 hours to about 24.0 hours at about 20° C./68° F. to about 150° C./302° F. in a UCA test, alternatively from about 2.0 hours to about 20.0 hours, alternatively from about 2.0 hours to about 18.0 hours, alternatively from about 3.0 hours to about 15.0 hours, or alternatively from about 3.0 hours to about 10.0 hours, when measured in accordance with test standard API-RP-10B-2.

In some embodiments, the composition has a 24-hour compressive strength (also referred to as "24-hour crush strength" or "24-hour crush compressive strength") measured in accordance with test standard API-RP-10B-2. The 24-hour compressive strength can be in a range of from about 50 psi to about 10,000 psi at from about 10° C./50° F. to about 80° C./176° F. in a UCA test, alternatively from about 100 psi to about 7,500 psi, alternatively from about 200 psi to about 5,500 psi, alternatively from about 250 psi to about 3,500 psi, alternatively from about 300 psi to about 2,500 psi, or alternatively from about 300 psi to about 2,000 psi. The time is 24-hour period after mixing the cement blend with the aqueous fluid.

A composition of the type disclosed herein can be prepared using any suitable method. In embodiments, the method comprises mixing components of the composition using mixing equipment (e.g., a batch mixer, a jet mixer, a re-circulating mixer, a blender, a mixing head of a solid feeding system). Mixing the components of the composition can comprise one or more steps. For example, mixing the components of the composition can comprise dry mixing components of the cement blend and optional other solid components (e.g., a weighting agent) to form a dry blend, and mixing the dry blend with an aqueous fluid and optional other additives to form a pumpable slurry (e.g., a homogeneous fluid). Any container(s) that is compatible with the components and has sufficient space can be used for mixing.

In embodiments, mixing the components of the composition can be on-the-fly (e.g., in real time or on-location). The composition can be used as a wellbore servicing fluid and be prepared at a wellsite. For example, the components of the cement blend can be transported to the wellsite and combined (e.g., mixed/blended) with an aqueous fluid located proximate the wellsite to form the composition. The aqueous fluid can be conveyed from a source to the wellsite or be available at the wellsite prior to the combining. The cement blend can be prepared at a location remote from the wellsite and transported to the wellsite, and, if necessary, stored at the on-site location. When it is desirable to prepare the composition at the wellsite, the components of the cement blend along with additional aqueous fluid and optional other additives can be mixed to form a mixture (e.g. in a blender tub, for example mounted on a trailer). Additives can be added to the composition during preparation thereof (e.g., during mixing) and/or on-the-fly (e.g., in real time or on-location) by addition to (e.g., injection into) the composition when being pumped into the wellbore.

The method disclosed herein can further comprise introducing the composition into a subterranean formation, and allowing at least a portion of the composition to set. In embodiments, introducing the composition into the subterranean formation uses one or more pumps.

A composition of the type disclosed herein can be used as a cementitious fluid. A cementitious fluid refers to a material that can set and be used to permanently seal an annular space between casing and a wellbore wall. A cementitious fluid can also be used to seal formations to prevent loss of drilling fluid (e.g., in squeeze cementing operations) and for operations ranging from setting kick-off plugs to plug and abandonment of a wellbore. Generally, a cementitious fluid used in oil field is pumpable in relatively narrow annulus over long distances. Disclosed herein is a method of servicing a wellbore penetrating a subterranean formation. In certain embodiments, the method comprises placing a composition disclosed herein into the wellbore.

In some embodiments, the composition is used in a subterranean workspace, for example in cementing underground pipe such as sewer pipe or wellbore casing. In certain embodiments, the composition is employed in primary cementing of a wellbore for the recovery of natural resources such as water or hydrocarbons. Primary cementing first involves drilling a wellbore to a desired depth such that the wellbore penetrates a subterranean formation while circulating a drilling fluid through the wellbore. Subsequent to drilling the wellbore, at least one conduit such as a casing may be placed in the wellbore while leaving a space known as the annulus (i.e., annular space) between the wall of the conduit and the wall of the wellbore. The drilling fluid may then be displaced down through the conduit and up through the annulus one or more times, for example, twice, to clean out the hole. The composition can then be conveyed (e.g., pumped) downhole and up through the annulus, thereby displacing the drilling fluid from the wellbore. In one or more embodiments, the composition sets into a hard mass, which forms a cement column that isolates an adjacent portion of the subterranean formation and provides support to the adjacent conduit.

In some other embodiments, the composition is employed in a secondary cementing operation such as squeeze cementing, which is performed after the primary cementing operation. In squeeze cementing, the composition can be forced under pressure into permeable zones through which fluid can undesirably migrate in the wellbore. Examples of such permeable zones include fissures, cracks, fractures, streaks, flow channels, voids, high permeability streaks, annular voids, or combinations thereof. The permeable zones can be present in the cement column residing in the annulus, a wall of the conduit in the wellbore, a micro annulus between the cement column and the subterranean formation, and/or a micro annulus between the cement column and the conduit. The composition can set within the permeable zones, thereby forming a hard mass to plug those zones and prevent fluid from leaking therethrough.

Figure 5:
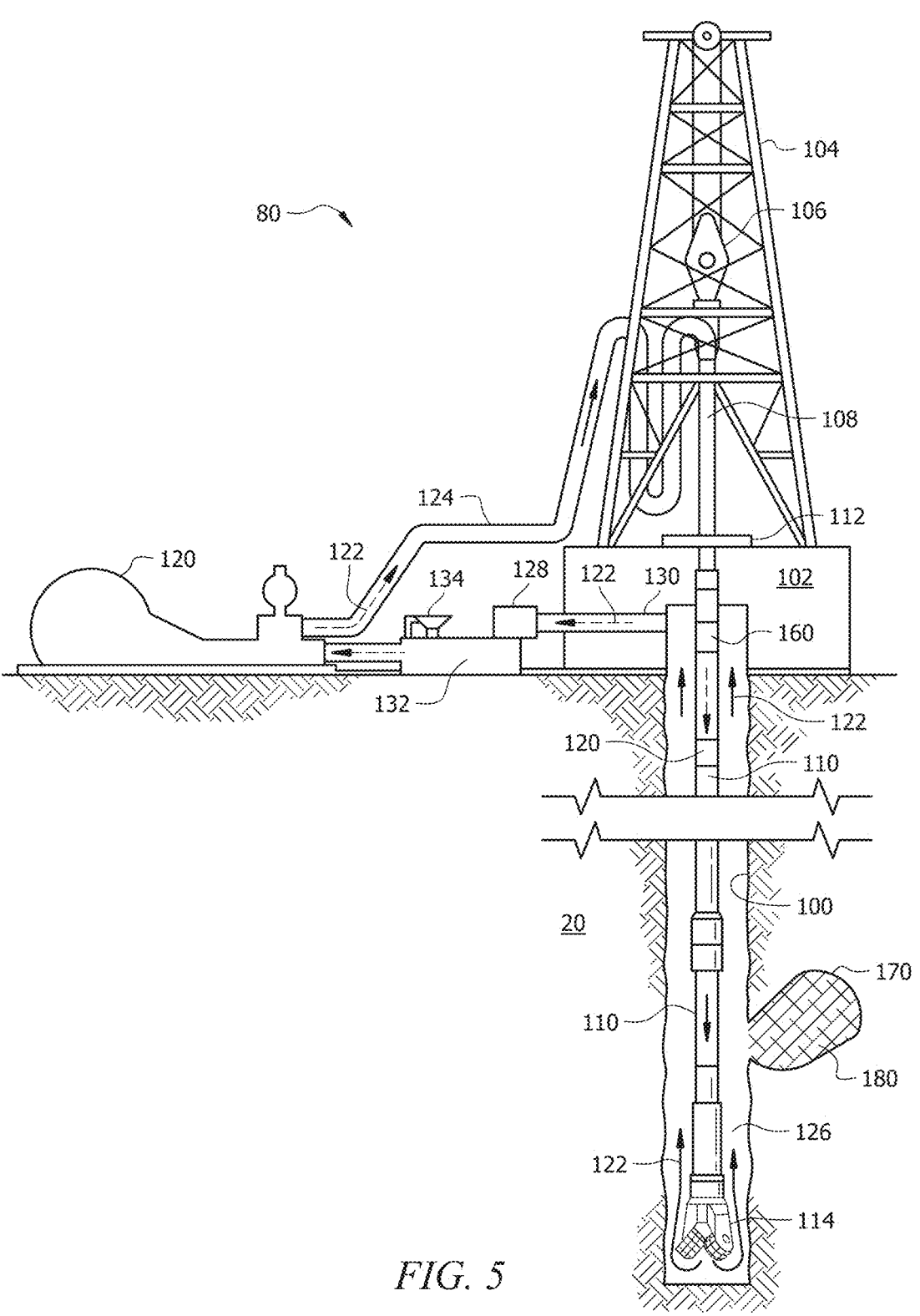
FIG. 5 is a schematic diagram of a wellbore drilling assembly that may deliver wellbore servicing fluids downhole in accordance with some embodiments of the disclosure.

For example, and with reference to FIG. 5, the wellbore servicing fluids of the present disclosure may directly or indirectly affect one or more components or pieces of equipment associated with an exemplary wellbore drilling assembly 80, according to one or more embodiments. It should be noted that while FIG. 5 generally depicts a land-based drilling assembly 80, those skilled in the art will readily recognize that the principles described herein are equally applicable to subsea drilling operations that employ floating or sea-based platforms and rigs, without departing from the scope of the disclosure.

As illustrated, the drilling assembly 80 may include a drilling platform 102 that supports a derrick 104 having a traveling block 106 for raising and lowering a drill string 110. The drill string 110 may include, but is not limited to, drill pipe and coiled tubing, as generally known to those skilled in the art. A kelly 108 supports the drill string 110 as it is lowered through a rotary table 112. A drill bit 114 is attached to the distal end of the drill string 110 and is driven either by a downhole motor and/or via rotation of the drill string 110 from the well surface. As the bit 114 rotates, it creates a borehole or wellbore 100 that penetrates various subterranean formations 20. A pump 120 (e.g., a mud pump) circulates a treatment fluid 122 (e.g., a drilling fluid) through a feed pipe 124 and to the kelly 108, which conveys the treatment fluid 122 downhole through the interior of the drill string 110 and through one or more orifices in the drill bit 114 (or optionally through a bypass or ports (not shown) along the drill string and above the drill bit 114). The treatment fluid 122 is then circulated back to the surface via an annulus 126 (or annular space 126) defined between the drill string 110 and the walls of the wellbore 100.

At the surface, the recirculated or spent treatment fluid 122 exits the annulus 126 and may be conveyed to one or more fluid processing unit(s) 128 via an interconnecting flow line 130. After passing through the fluid processing unit(s) 128, a "cleaned" treatment fluid 122 is deposited into a nearby retention pit 132 (i.e., a mud pit). While illustrated as being arranged at the outlet of the wellbore 100 via the annulus 126, those skilled in the art will readily appreciate that the fluid processing unit(s) 128 may be arranged at any other location in the wellbore drilling assembly 80 to facilitate its proper function, without departing from the scope of the scope of the disclosure.

One or more of the disclosed treatment fluids may be added to the treatment fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the wellbore servicing fluids of the present disclosure may be added to the treatment fluid 122 at any other location in the drilling assembly 80. In at least one embodiment, for example, there could be more than one retention pit 132, such as multiple retention pits 132 in series. Moreover, the retention pit 132 may be representative of one or more fluid storage facilities and/or units where the wellbore servicing fluids of the present disclosure may be stored, reconditioned, and/or regulated until added to the treatment fluid 122.

As mentioned above, the wellbore servicing fluids of the present disclosure may directly or indirectly affect the components and equipment of the drilling assembly 80. For example, the wellbore servicing fluids of the present disclosure may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid processing unit(s) 128 may further include one or more sensors, gauges, pumps, compressors, and the like used store, monitor, regulate, and/or recondition the exemplary wellbore servicing fluids.

The wellbore servicing fluids of the present disclosure may directly or indirectly affect the pump 120, which representatively includes any conduits, pipelines, trucks, tubulars, and/or pipes used to fluidically convey the wellbore servicing fluids downhole, any pumps, compressors, or motors (e.g., topside or downhole) used to drive the wellbore servicing fluids into motion, any valves or related joints used to regulate the pressure or flow rate of the wellbore servicing fluids, and any sensors (i.e., pressure, temperature, flow rate, etc.), gauges, and/or combinations thereof, and the like. The wellbore servicing fluids of the present disclosure also may directly or indirectly affect the mixing hopper 134 and the retention pit 132 and their assorted variations.

The wellbore servicing fluids of the present disclosure also may directly or indirectly affect the various downhole equipment and tools that may come into contact with the wellbore servicing fluids such as, but not limited to, the drill string 110, any floats, drill collars, mud motors, downhole motors and/or pumps associated with the drill string 110, and any tools and related telemetry equipment, sensors or distributed sensors associated with the drill string 110. The wellbore servicing fluids of the present disclosure also may directly or indirectly affect any downhole heat exchangers, valves and corresponding actuation devices, tool seals, packers and other wellbore isolation devices or components, and the like associated with the wellbore 100. The wellbore servicing fluids of the present disclosure also may directly or indirectly affect the drill bit 114, which may include, but is not limited to, roller cone bits, PDC bits, natural diamond bits, any hole openers, reamers, coring bits, etc.

During, drilling, a lost circulation zone (LCZ) 170 may be encountered and loss of treatment fluid 122 may occur. A wellbore servicing fluid 140 including a cement composition with the cured geopolymer particles can be provided to plug the LCZ 170. In such an instance, the drilling can cease and a first spacer fluid 120, the wellbore servicing fluid 140, and a second spacer fluid 160 can be provided with the first spacer fluid 120 downhole of the wellbore servicing fluid 140 and the second spacer fluid 160 uphole of the wellbore servicing fluid 140. The spacers 120 and 160 can isolate the wellbore servicing fluid 140 from the treatment fluid 122. The wellbore servicing fluid 140 can be placed at the LCZ 170 to set forming a set cement or concrete 180 to plug the LCZ 170. Thereafter, drilling can resume.

Figure 6:
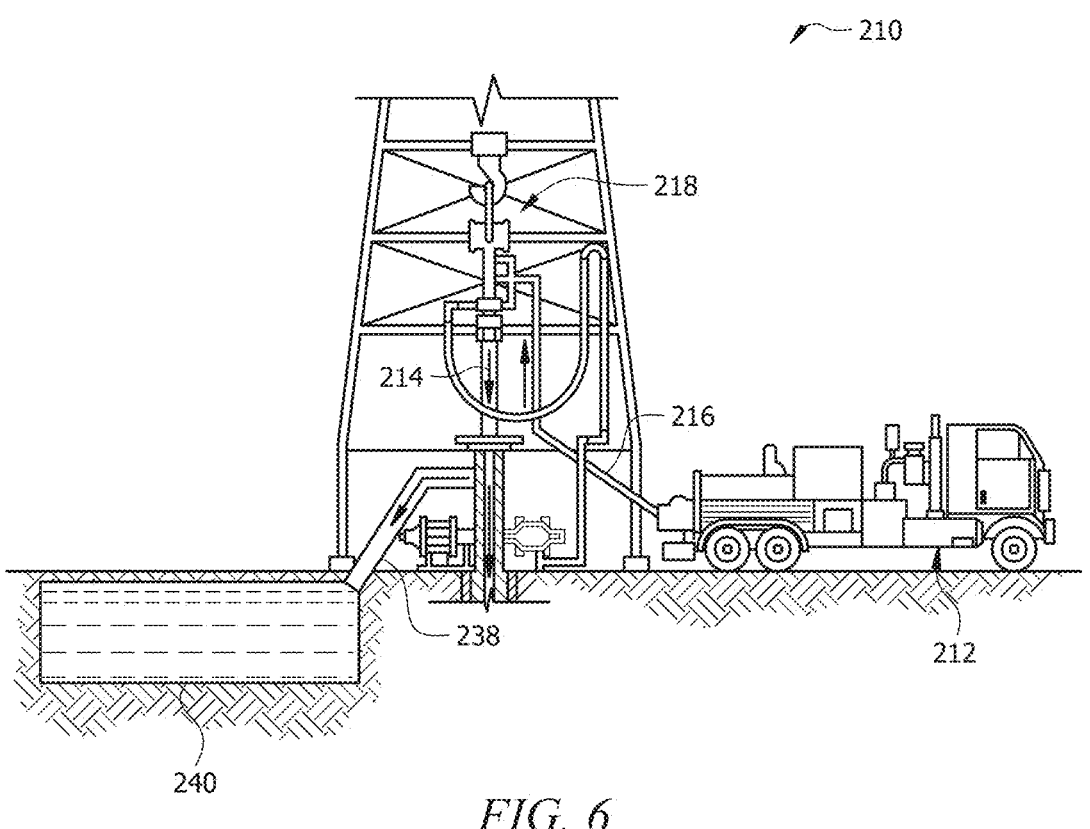
FIG. 6 is a schematic representation of surface equipment that may be used in placement of cement compositions in accordance with some embodiments of the disclosure.

After drilling or drilling a segment of the wellbore, cementing of the wellbore 100 may be undertaken. An example technique and system for placing a cement composition into a subterranean formation 20 will now be described with reference to FIGS. 6-7. FIG. 6 illustrates surface equipment 210 that may be used in placement of a cement composition in accordance with certain embodiments. It should be noted that while FIG. 6 generally depicts a land-based operation, those skilled in the art will readily recognize that the principles described herein are equally applicable to subsea operations that employ floating or sea-based platforms and rigs, without departing from the scope of the disclosure. As illustrated by FIG. 6, the surface equipment may include a cementing unit 212, which may include one or more cement trucks. The cementing unit 212 may include mixing equipment and pumping equipment as will be apparent to those of ordinary skill in the art. However, in some embodiments, the cement compositions of the present disclosure may be mixed prior to delivery to the wellbore operation.

In some embodiments, where the cement composition is mixed prior to delivery to the wellbore operation, the footprint of the operation equipment may be reduced. The cementing unit 212 may pump a cement composition 214 through a feed pipe 216 and to a cementing head 218 which conveys the cement composition 214 downhole. Surface equipment 210 may include one or more retention pits 240 (e.g., a mud pit) connected to the wellbore via a flow line 238.

Figure 7:
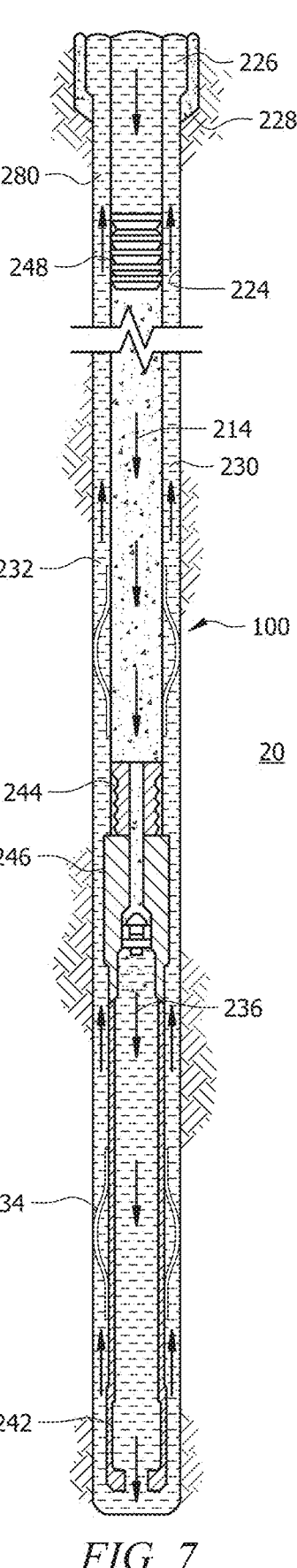
FIG. 7 is a schematic representation of downhole equipment that may be used in placement of cement compositions in accordance with some embodiments of the disclosure.

Turning now to FIG. 7, the cement composition 214 may be placed into a subterranean formation 20 in accordance with example embodiments. As illustrated, a wellbore 100 may be drilled into the subterranean formation 20. While wellbore 100 is shown extending generally vertically into the subterranean formation 20, the principles described herein are also applicable to wellbores that extend at an angle through the subterranean formation 20, such as horizontal and slanted well bores. As illustrated, the wellbore 100 includes walls 224. In the illustrated embodiments, a surface casing 226 has been inserted into the wellbore 100. The surface casing 226 may be cemented to the walls 224 of the wellbore 100 by cement sheath 228. In the illustrated embodiment, one or more additional conduits (e.g., intermediate casing, conduit, tubular, production casing, liners, etc.) shown here as a casing 230 also may be disposed in the wellbore 100. As illustrated, there is a well bore annulus 232 (e.g., annular space) formed between the casing 230 and the walls 224 of the wellbore 100 and/or the surface casing 226. One or more centralizers 234 may be attached to the casing 230, for example, to centralize the casing 230 in the wellbore 100 prior to and during the cementing operation.

With continued reference to FIG. 7, the cement composition 214 may be pumped down the interior of the casing 230. The cement composition 214 may be allowed to flow down the interior of the casing 230 through the casing shoe 242 at the bottom of the casing 230 and up around the casing 230 into the well bore annulus 232. The cement composition 214 may be allowed to set in the well bore annulus 232, for example, to form a cement sheath that supports and positions the casing 230 in the wellbore 100. While not illustrated, other techniques also may be utilized for introduction of the cement composition 214. By way of example, reverse circulation techniques may be used that include introducing the cement composition 214 into the subterranean formation 20 by way of the well bore annulus 232 instead of through casing 230.

As it is introduced, the cement composition 214 may displace other fluids 236, such as drilling fluids and/or spacer fluids, that may be present in the interior of the casing 230 and/or 230 the well bore annulus 232. As an example, at the initiation of cementing operations a first spacer may be placed downhole of a wellbore servicing fluid, such as the cement composition 214. At the termination of cementing operations, a second spacer fluid can be placed uphole of the wellbore servicing fluid prior to reintroduction into of, e.g., a drilling fluid. At least a portion of the displaced fluids 236 may exit the well bore annulus 232 via a flow line 238 and be deposited, for example, in one or more retention pits 240 (e.g. a mud pit), as shown on FIG. 6. Referring again to FIG. 7, a bottom plug 244 may be introduced into the wellbore 100 ahead of the cement composition 214, for example, to separate the cement composition 214 from the fluids 236 that may be inside the casing 230 prior to cementing. After the bottom plug 244 reaches the landing collar 246, a diaphragm or other suitable device ruptures to allow the cement composition 214 through the bottom plug 244. In FIG. 7, the bottom plug 244 is shown on the landing collar 246. In the illustrated embodiment, a top plug 248 may be introduced into the wellbore 100 behind the cement composition 214. The top plug 248 may separate the cement composition 214 from a displacement fluid and also push the cement composition 214 through the bottom plug 244. After the providing the requisite amount of cement, the cement can be allowed to become stationary and solidify to form a set cement or concrete 280.

Various benefits may be realized by utilization of the presently disclosed methods and compositions. The composition as disclosed herein can develop suitable mechanical properties and permeability after setting and has a relatively low carbon footprint. The composition can also be expansive and thus avoid forming flow channels after setting of the composition.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Geopolymer particles were formed by first curing a standard geopolymer formulation in sheets to provide for easy grinding into particles. The geopolymer formulation is shown in Table 3 below.

TABLE 3

| Material | wt. (gram) |
|---|---|
| metakaolin | 100.0 |
| sodium silicate (solid) | 31.0 |
| sodium hydroxide | 3.0 |
| water | 55.0 |

The process for curing and forming the particles was as follows. The water was added to a standard blender jar and the blending speed was set at 500 revolutions per minute (rpm). Next, NaOH flakes were added and blending was continued until all flakes were dissolved. The solution was allowed to cure to room temperature.

The sodium silicate powder was then added and allowed to dissolve. After the mixture cooled to room temperature, the metakaolin was added. The blender speed was increased to about 1,500 rpm for two minutes to ensure complete mixing. An 18 inch by 12 inch sheet pan was prepared by lining the bottom with a plastic wrap.

The geopolymer mixture was poured into the pan and spread out into a thin sheet. Next, another sheet of plastic wrap was placed over the geopolymer and sealed to the sheet of plastic wrap on the bottom. The pan with the geopolymer mixture was then placed in an oven at 140° C. and allowed to cure for 48 hours. After curing, the plastic film was removed and the cured geopolymer was broken into small pieces. The small pieces of geopolymer were then ground in a coffee grinder to form a geopolymer powder. The geopolymer powder was sieved with a 40 mesh sieve to obtain about 40 mesh geopolymer particles, as depicted in FIG. 1.

After formation of geopolymer particles, they were combined with a particulate cementitious material including a Portland cement to determine their effectiveness at accelerating strength development in Low Portland cement formulations as well as their effect on rheology.

The formulations tested are shown in Tables 4-6. Table 4 depicts formulations of low Portland cement by weight of blend excluding the cured geopolymer (GP) particles and slurry densities. Table 5 depicts the weight percent of each component in the dry blend on % BWOB in the table body and as % BWOB-ECGP for the GP particles at the top of the columns. Table 6 provides the volume percent of each component in the low Portland cement formulations in the body of the table and as % BWOB-ECGP for the GP particles at the top of the columns.

TABLE 4

| Material | Control<br>% BWOB-<br>ECGP | 1% GP<br>Particles<br>% BWOB-<br>ECGP | 10% GP<br>Particles<br>% BWOB-<br>ECGP | 100% GP<br>Particles<br>% BWOB-<br>ECGP |
|---|---|---|---|---|
| Low Portland Cement Blend | 100.0 | 100.0 | 100.0 | 100.0 |
| GP Particles | 0.0 | 1.0 | 10.0 | 100.0 |
| Suspending Aid | 0.05 | 0.05 | 0.05 | 0.05 |
| Water | 60.9 | 60.9 | 60.9 | 100.4 |
| Slurry Density (ppg) | 13.6 | 13.6 | 13.6 | 13.6 |

TABLE 5

| Material | Control<br>% BWOB | 1% GP<br>Particles<br>% BWOB-<br>ECGP<br>% BWOB | 10% GP<br>Particles<br>% BWOB-<br>ECGP<br>% BWOB | 100% GP<br>Particles<br>% BWOB-<br>ECGP<br>% BWOB |
|---|---|---|---|---|
| Portland Cement | 29.7 | 29.4 | 27.0 | 14.8 |
| Volcanic Rock | 40.6 | 40.2 | 36.9 | 20.3 |
| Fly Ash | 29.7 | 29.4 | 27 | 14.9 |
| GP Particles | 0.0 | 1.0 | 9.1 | 50.0 |

TABLE 6

| Material | Control<br>Vol. % | 1% GP<br>Particles<br>% BWOB-<br>ECGP<br>Vol. % | 10% GP<br>Particles<br>% BWOB-<br>ECGP<br>Vol. % | 100% GP<br>Particles<br>% BWOB-<br>ECGP<br>Vol. % |
|---|---|---|---|---|
| Portland Cement | 9.4 | 9.4 | 9.0 | 5.1 |
| Volcanic Rock | 17.1 | 17.0 | 16.4 | 9.2 |
| Fly Ash | 11.6 | 11.5 | 11.1 | 6.2 |
| GP Particles | 0.0 | 0.5 | 4.4 | 24.9 |
| Suspending Aid | 0.03 | 0.03 | 0.03 | 0.03 |
| Water | 61.8 | 61.5 | 59.1 | 54.6 |

The low Portland slurry and low Portland slurries with geopolymer particles were prepared as follows. First, all dry components were weighed into a glass container having a clean lid and agitated by hand until blended. Tap water was then weighed into a blender jar. The dry components were then mixed into the water with 4,000 rpm blending speed. The blending speed was then increased to 12,000 rpm for about 35 seconds.

Immediately after blending the slurries were conditioned for 30 minutes at 80° F. and the rheologies were then taken on a digital rheometer sold under the trade designation RheoVADR from Fann® Instrument Company of Houston, Texas with an FYSA attachment (Rheo VADR). Following this, the compressive strengths were measured with an ultrasonic cement analyzer (UCA) set at 80° F. and 3,000 psi.

The low Portland slurries with liquid geopolymer were prepared as follows. First, two separate slurries were prepared, a low Portland cement slurry and a geopolymer liquid slurry. For the low Portland cement slurry which had the same formulation as the slurry in "Table 6-Control", all dry components were weighed into a glass container having a clean lid and agitated by hand until blended. Tap water was then weighed into a blender jar. The dry components were then mixed into the water with 4,000 rpm blending speed. The blending speed was then increased to 12,000 rpm for about 35 seconds.

The geopolymer liquid had the same formulation as noted in Table 3. In this case, the same geopolymer blending procedure was followed, but stopped after complete mixing by increasing the blender speed to about 1,500 rpm for about two minutes, to form the geopolymer liquid without curing. The two slurries were then mixed at the proportions shown below in Table 7 at 1,500 rpm for about 2 minutes, after which homogenous low Portland-geopolymer liquid slurries were obtained. Formulations of low Portland cements with GP Liquid by weight of blend (% BWOB-ECGP) and slurry densities.

TABLE 7

| Material | 1% GP Liquid % BWOB-ECGP | 10% GP Liquid % BWOB-ECGP |
|---|---|---|
| Low Portland Cement Blend | 100.0 | 100.0 |
| GP Liquid | 1.0 | 10.0 |
| Suspending Aid | 0.05 | 0.05 |
| Water | 60.9 | 60.9 |
| Slurry Density (ppg) | 13.6 | 13.6 |

Immediately after blending, the slurries were conditioned for 30 minutes at 80° F. and the rheologies were then taken on a RheoVADR. As depicted in Tables 8 and 9, calculated apparent viscosity (AVIS) in centipoise of low Portland cement slurry and low Portland cement with various amounts of geopolymer particles are as follows:

22

TABLE 8

| RPM | Shear Rate (1/sec) | Control AVIS (cP) | 1% GP Particles % BWOB-ECGP AVIS (cP) | 10% GP Particles % BWOB-ECGP AVIS (cP) | 100% GP Particles % BWOB-ECGP AVIS (cP) |
|---|---|---|---|---|---|
| 3 | 5.1 | 1,353 | 1,251 | 2,841 | 1,372 |
| 6 | 10.2 | 753 | 692 | 1,445 | 858 |
| 30 | 51.1 | 225 | 207 | 325 | 417 |
| 60 | 102.1 | 145 | 136 | 183 | 353 |
| 100 | 170.2 | 109 | 104 | 126 | 326 |
| 200 | 340.4 | 78 | 77 | 82 | 303 |
| 300 | 510.6 | 66 | 66 | 67 | 295 |
| 600 | 1,021.2 | 51 | 54 | 51 | 286 |

TABLE 9

| RPM | Shear Rate (1/sec) | 1% GP Liquid % BWOB-ECGP AVIS (cP) | 10% GP Liquid % BWOB-ECGP AVIS (cP) |
|---|---|---|---|
| 3 | 5.1 | 2,634 | 2,841 |
| 6 | 10.2 | 1,408 | 1,445 |
| 30 | 51.1 | 348 | 325 |
| 60 | 102.1 | 197 | 183 |
| 100 | 170.2 | 131 | 126 |
| 200 | 340.4 | 77 | 82 |
| 300 | 510.6 | 57 | 67 |
| 600 | 1,021.2 | 35 | 51 |

Following this, the compressive strengths were measured with an ultrasonic cement analyzer (UCA) set at 80° F. and 3,000 psi. Table 10 depicts a summary of compressive strength and rheological results and Table 11 depicts a summary of percent change as compared to the Control slurry for each parameter.

TABLE 10

| Slurry | Time at 50 psi (hour:minute) | 24 hr. UCA C.S. (psi) | 72 hr. UCA C.S. (psi) | 7 Day UCA C.S. (psi) | AVIS @ 3 rpm (cP) | AVIS @ 6 rpm (cP) |
|---|---|---|---|---|---|---|
| Control | 19:35 | 101 | 466 | 646 | 1,353 | 753 |
| 1% GP Particles % BWOB-ECGP | 22:08 | 70 | 547 | 859 | 1,251 | 692 |
| 10% GP Particles % BWOB-ECGP | 9:48 | 229 | 938 | 1,719 | 2,005 | 1,035 |
| 100% GP Particles % BWOB-ECGP | — | — | — | — | 1,372 | 858 |
| 1% GP Liquid % BWOB-ECGP | 19:54 | 85 | 435 | 620 | 2,634 | 1,408 |
| 10% GP Liquid % | 10:57 | 361 | 1,639 | 2,309 | 2,841 | 1,445 |

TABLE 10-continued

| Slurry | Time at 50 psi (hour:minute) | 24 hr. UCA C.S. (psi) | 72 hr. UCA C.S. (psi) | 7 Day UCA C.S. (psi) | AVIS @ 3 rpm (cP) | AVIS @ 6 rpm (cP) |
|---|---|---|---|---|---|---|
| BWOB-ECGP | | | | | | |

TABLE 11

| Slurry | Time at 50 psi (% change) | 24 hr. UCA C.S. (% change) | 72 hr. UCA C.S. (% change) | 7 Day UCA C.S. (% change) | AVIS @ 3 rpm (% change) | AVIS @ 6 rpm (% change) |
|---|---|---|---|---|---|---|
| 1% GP Particles % BWOB-ECGP | 13 | −31 | 17 | 33 | −8 | −8 |
| 10% GP Particles % BWOB-ECGP | −50 | 127 | 101 | 166 | 48 | 37 |
| 100% GP Particles % BWOB-ECGP | — | — | — | — | 1 | 14 |
| 1% GP Liquid % BWOB-ECGP | 2 | −16 | −7 | −4 | 95 | 87 |
| 10% GP Liquid % BWOB-ECGP | −44 | 257 | 252 | 257 | 110 | 92 |

As represented in Tables 8 and 9, particulates of GP ranging in amounts from 10% to 100% BWOB-ECGP hold relatively stable viscosity from RPMs of 60 to 600 (shear rate 102.1 per second to 1,021.2 per second). This stability corresponds to a significant and unexpected dynamic transport efficiency or an apparent viscosity for a wellbore servicing fluid for transporting materials, such as lost circulation materials, in a laminar flow in regions experiencing variance in shear rate, such as slim holes.

As represented in Tables 10 and 11, the GP particles, when incorporated at 10% BWOB-ECGP decreased the time to 50 psi (set time) by 50% and increased the overall strength development (seven day) by 166%. At 1% BWOB-ECGP, the time to 50 psi was not positively affected, however the overall compressive strength was increased by 33%. Rheologically, at 10% BWOB-ECGP the AVIS (at 3 and 6 RPM increased by 48 and 37% respectively, which, although a bit higher than the conventional low Portland cement, remains within an acceptable viscosity range for mixing and pumping. The viscosity at 1% BWOB-ECGP was reduced by 8% for both rpms.

Combining geopolymers with SCMs and Portland cements has been done previously but typically results in cement slurries with greatly increased viscosities. Geopolymer liquid was used here as a control to compare against the effectiveness of the geopolymer particles. Tables 10 and 11 summarize this data along with the AVIS measurements. When using the liquid version, although the compressive strength development was greatly increased for 10% BWOB-ECGP, the AVIS at 3 and 6 RPM increased dramatically and most likely would be unmixable for operations. Furthermore, the 1% BWOB-ECGP of geopolymer liquid in low Portland cement produced no enhancement in strength development, but was still potentially detrimental to viscosity.

Figure 8:
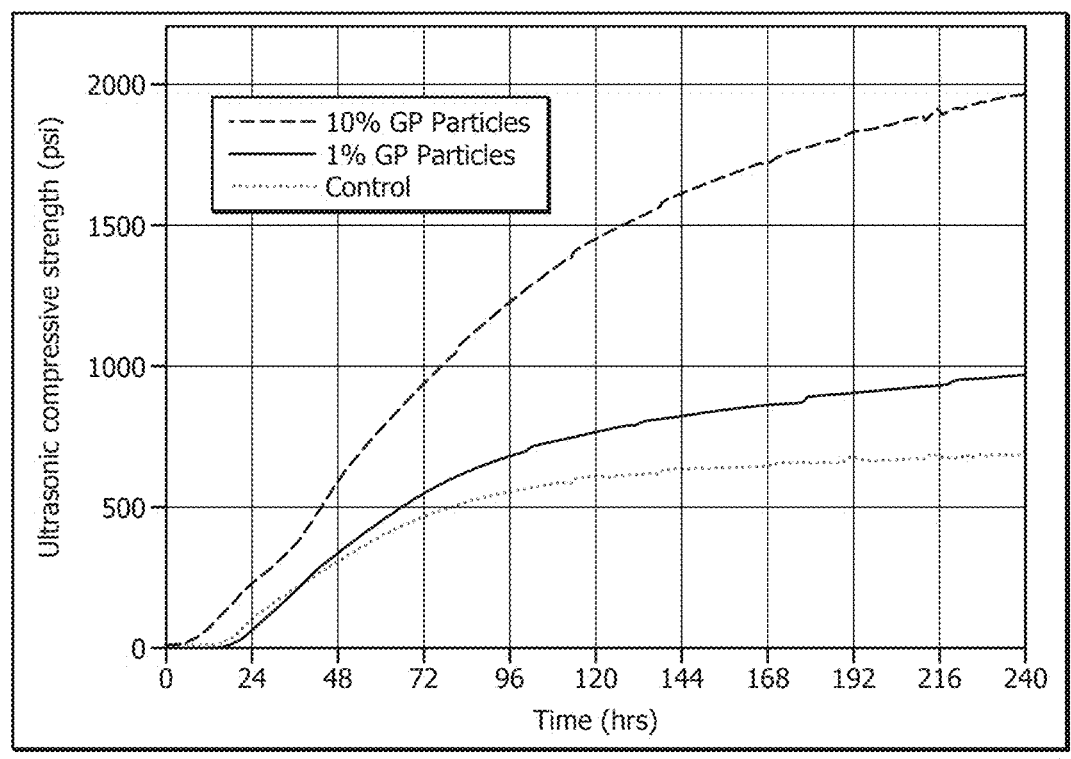
FIG. 8 is a graphical depiction comparing ultrasonic compressive strength versus time for several compositions in accordance with some embodiments of the disclosure.
Figure 9:
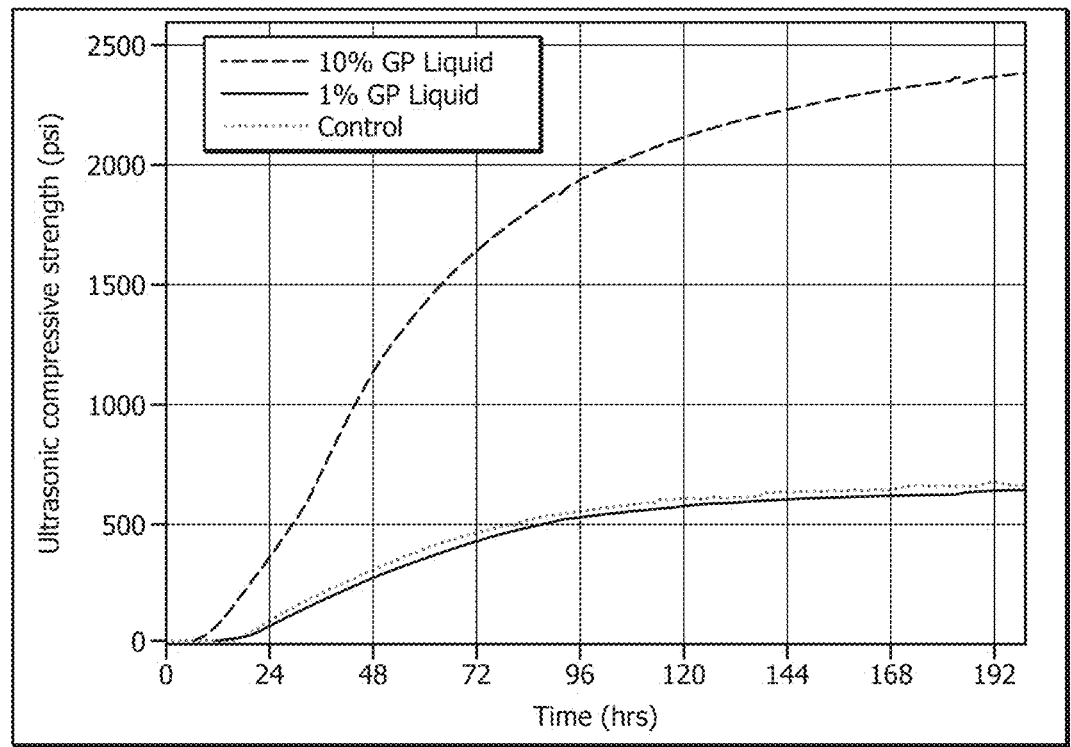
FIG. 9 is a graphical depiction comparing ultrasonic compressive strength versus time for several compositions in accordance with some embodiments of the disclosure.

FIG. 8 shows the advantages gained by utilizing GP particles in low Portland cement blends, both for acceleration of strength development and for greater overall strength development. Particularly, the 10% BWOB-ECGP shows significant and unexpected UCA values from 24 hours to 168 hours compared to 1% BWOB-ECGP and the Control. FIG. 9 represents the strength development of low Portland blends with a typical liquid geopolymer formulation at 1% and 10% BWOB-ECGP. Again, the 10% BWOB-ECGP shows significant and unexpected UCA values from 24 hours to 168 hours compared to 1% BWOB-ECGP and the Control. In summary, the benefits of including geopolymers in low Portland cements can be obtained without negative rheological effects of geopolymer liquid by utilizing cured geopolymer particles.

Additional Disclosure

The following is provided as additional disclosure for combinations of features and embodiments of the present disclosure.

A first embodiment which is a geopolymer particle, comprising made by contacting an aluminosilicate, a metal hydroxide, a metal silicate, and an aqueous fluid to form a mixture; and reducing a size of an obtained geopolymer from the mixture to form the geopolymer particle.

A second embodiment which is the geopolymer particle of the first embodiment, wherein the metal hydroxide comprises lithium hydroxide, sodium hydroxide, potassium hydroxide, or any combination thereof.

A third embodiment which is the geopolymer particle of the first embodiment or second embodiment, wherein the metal hydroxide comprises sodium hydroxide.

A fourth embodiment which is the geopolymer particle of any of the proceeding embodiments, wherein the metal silicate comprises lithium silicate, sodium silicate, potassium silicate, or any combination thereof.

A fifth embodiment which is the geopolymer particle of any of the proceeding embodiments, wherein the metal silicate comprises sodium silicate.

A sixth embodiment which is the geopolymer particle of any of the proceeding embodiments, wherein the aqueous fluid comprises fresh water, salt water, brine, a produced water, a surface water, or any combination thereof.

A seventh embodiment which is the geopolymer particle of any of the proceeding embodiments, further comprising curing the mixture at about 100° C. to about 600° C., about 110° C. to about 500° C., about 120° C. to about 180° C., about 130° C. to about 160° C., or about 140° C. for at least about 24 hour (hr), at least about 48 hr, at least about 72 hr, or about 24 hr to about 120 hr to obtain the geopolymer which is cured, wherein the geopolymer particle comprises a cured geopolymer particle.

An eighth embodiment which is the geopolymer particle of the seventh embodiment, further comprising, prior to curing, sealing the mixture.

A ninth embodiment which is the geopolymer particle of any of the proceeding embodiments, wherein the contacting further comprises contacting the metal hydroxide and the aqueous fluid and mixing at about 100 to about 1,000 revolutions per minute (rpm), about 200 to about 800 rpm, about 400 rpm to about 600 rpm, about 450 to about 550 rpm, or about 500 rpm to form a first solution, and an initial curing the first solution at about 10° C. to about 30° C., about 15° C. to about 25° C., or about 20° C. to about 22° C.

A tenth embodiment which is the geopolymer particle of any of the proceeding embodiments, wherein the contacting further comprises contacting the first solution with a metal silicate to form a second solution and cooling to the second solution at about 10° C. to about 30° C., about 15° C. to about 25° C., or about 20° C. to about 22° C.

An eleventh embodiment which is the geopolymer particle of any of the proceeding embodiments, wherein the contacting further comprising contacting the aluminosilicate and mixing at about 1,000 to about 2,000 revolutions per minute (rpm), about 1,200 rpm to about 1,800 rpm, about 1,400 to about 1,600 rpm, about 1,450 to about 1,550 rpm, or about 1,500 rpm, for about 10 seconds to about 600 seconds, about 30 seconds to about 300 seconds, about 50 seconds to about 200 seconds, about 100 seconds to about 140 seconds, or about 120 seconds.

A twelfth embodiment which is the geopolymer particle of any of the proceeding embodiments, wherein the cured geopolymer particle has a $D_{50}$ particle size of about 1 micron (μm) to about 1,000 μm, about 10 μm to about 800 μm, about 20 μm to about 700 μm, about 30 μm to about 600 μm, about 30 μm to about 500 μm, about 30 μm to about 300 μm, about 30 μm to about 200 μm, about 80 μm to about 180 μm, about 120 μm to about 160 μm, or about 162 μm.

A thirteenth embodiment which is the geopolymer particle of any of the proceeding embodiments, wherein the cured geopolymer particle has a $D_{10}$ particle size of about 1 μm to about 100 μm, about 10 μm to about 80 μm, about 20 μm to about 60 μm, about 30 μm to about 40 μm, or about 33.9 μm.

A fourteenth embodiment which is the geopolymer particle of any of the proceeding embodiments, wherein the cured geopolymer particle has a $D_{90}$ particle size of 100 μm to about 1,000 μm, about 200 μm to about 900 μm, about 300 μm to about 700 μm, about 400 μm to about 600 μm, about 450 μm to about 550 μm, or about 474 μm.

A fifteenth embodiment which is a geopolymer particle, comprises, by weight percent (wt. %) based on oxide: about 40 to about 80, about 50 to about 70, about 55 to about 65, about 60 to about 62, about 60 to about 61, or about 60.45 $SiO_2$; about 10 to about 50, about 20 to about 45, about 30 to about 40, about 33 to about 37, about 35 to about 36, or about 35.65 $Al_2O_3$; about 0.1 to about 4, about 1 to about 3, or about 1.2 to about 2, about 1.6 to about 1.7, or about 1.66 $TiO_2$; about 0.1 to about 2, about 0.5 to about 1.5, about 0.9 to about 1.1, about 1.0 to about 1.1, or about 1.01 $Fe_2O_3$; about 0.5 to about 1.0, about 0.6 to about 0.9, about 0.75 to about 0.85, or about 0.79 I; about 0.1 to about 0.3, about 0.13 to about 0.2, or about 0.16 CaO; about 0.05 to about 0.15, about 0.08 to about 0.10, or about 0.09 $K_2O$; about 0.04 to about 0.08, about 0.05 to about 0.07, or about 0.06 $Cs_2O$; about 0.03 to about 0.07, about 0.04 to about 0.06, or about 0.05 $ZrO_2$; about 0.01 to about 0.05, about 0.02 to about 0.04, or about 0.03 $P_2O_5$; about 0.01 to about 0.03, or about 0.02 $Cr_2O_3$; and about 0.01 to about 0.03, or about 0.02 $Ir_2O_3$.

A sixteenth embodiment which is the geopolymer particle of the fifteenth embodiment, wherein the geopolymer particle is obtained from recycling and reducing a size of a geopolymer.

A seventeenth embodiment which is the geopolymer particle of the fifteenth embodiment or the sixteenth embodiment, wherein the geopolymer particle has a $D_{50}$ particle size of about 1 micron (μm) to about 1,000 μm, about 10 μm to about 800 μm, about 20 μm to about 700 μm, about 30 μm to about 600 μm, about 30 μm to about 500 μm, about 30 μm to about 300 μm, about 30 μm to about 200 μm, about 80 μm to about 180 μm, about 120 μm to about 160 μm, or about 162 μm.

An eighteenth embodiment which is the geopolymer particle of any of the fifteenth embodiment to the seventeenth embodiment, wherein the geopolymer particle has a $D_{10}$ particle size of about 1 μm to about 100 μm, about 10 μm to about 80 μm, about 20 μm to about 60 μm, about 30 μm to about 40 μm, or about 33.9 μm.

A nineteenth embodiment which is the geopolymer particle of any of the fifteenth embodiment to the eighteenth embodiment, wherein the geopolymer particle has a $D_{90}$ particle size of 100 μm to about 1,000 μm, about 200 μm to about 900 μm, about 300 μm to about 700 μm, about 400 μm to about 600 μm, about 450 μm to about 550 μm, or about 474 μm.

A twentieth embodiment which is a process of making cured geopolymer particles, comprises: contacting an aluminosilicate, a metal hydroxide, a metal silicate, and an aqueous fluid to form a mixture; curing the mixture at about 100° C. to about 600° C., about 110° C. to about 500° C. about 120° C. to about 180° C., about 130° C. to about 160° C., or about 140° C. for at least about 24 hour (hr), at least about 48 hr, at least about 72 hr, or about 24 hr to about 120 hr to obtain a cured geopolymer; and reducing a size of the cured geopolymer to obtain a cured geopolymer particle, by optionally grinding the cured geopolymer to obtain the cured geopolymer particle.

A twenty-first embodiment which is the process of the twentieth embodiment, wherein the metal hydroxide comprises lithium hydroxide, sodium hydroxide, potassium hydroxide, or any combination thereof.

A twenty-second embodiment which is the process of the twentieth embodiment or the twenty-first embodiment, wherein the metal hydroxide comprises sodium hydroxide.

A twenty-third embodiment which is the process of any of the twentieth embodiment to the twenty-second embodiment, wherein the metal silicate comprises lithium silicate, sodium silicate, potassium silicate, or any combination thereof.

A twenty-fourth embodiment which is the process of any of the twentieth embodiment to the twenty-third embodiment, wherein the metal silicate comprises sodium silicate.

A twenty-five embodiment which is the process of any of the twentieth embodiment to the twenty-fourth embodiment, wherein the contacting further comprises contacting the metal hydroxide and an aqueous fluid and mixing at about 100 to about 1,000 revolutions per minute (rpm), about 200 to about 800 rpm, about 400 rpm to about 600 rpm, about 450 to about 550 rpm, or about 500 rpm to form a first solution, and an initial curing the first solution at about 10° C. to about 30° C., about 15° C. to about 25° C., or about 20° C. to about 22° C.

A twenty-six embodiment which is the process of any of the twentieth embodiment to the twenty-five embodiment, wherein the contacting further comprises contacting the first solution with a metal silicate to form a second solution and cooling to the second solution at about 10° C. to about 30° C., about 15° C. to about 25° C., or about 20° C. to about 22° C.

A twenty-seven embodiment which is the process of any of the twentieth embodiment to the twenty-six embodiment, wherein the contacting further comprising contacting the aluminosilicate and mixing at about 1,000 to about 2,000 revolutions per minute (rpm), about 1,200 rpm to about 1,800 rpm, about 1,400 to about 1,600 rpm, about 1,450 to about 1,550 rpm, or about 1,500 rpm, for about 10 seconds to about 600 seconds, about 30 seconds to about 300 seconds, about 50 seconds to about 200 seconds, about 100 seconds to about 140 seconds, or about 120 seconds.

A twenty-eighth embodiment which is the process of any of the twentieth embodiment to the twenty-seven embodiment, further comprising, prior to curing, sealing the mixture.

A twenty-ninth embodiment which is the process of any of the twentieth embodiment to the twenty-eighth embodiment, wherein the cured geopolymer particle has a $D_{50}$ particle size of about 1 micron ($\mu$m) to about 1,000 $\mu$m, about 10 $\mu$m to about 800 $\mu$m, about 20 $\mu$m to about 700 $\mu$m, about 30 $\mu$m to about 600 $\mu$m, about 30 $\mu$m to about 500 $\mu$m, about 30 $\mu$m to about 300 $\mu$m, about 30 $\mu$m to about 200 $\mu$m, about 80 $\mu$m to about 180 $\mu$m, about 120 $\mu$m to about 160 $\mu$m, or about 162 $\mu$m.

A thirtieth embodiment which is the process of any of the twentieth embodiment to the twenty-ninth embodiment, wherein the cured geopolymer particle has a $D_{10}$ particle size of about 1 $\mu$m to about 100 $\mu$m, about 10 $\mu$m to about 80 $\mu$m, about 20 $\mu$m to about 60 $\mu$m, about 30 $\mu$m to about 40 $\mu$m, or about 33.9 $\mu$m.

A thirty-first embodiment which is the process of any of the twentieth embodiment to the thirtieth embodiment, wherein the cured geopolymer particle has a $D_{90}$ particle size of 100 $\mu$m to about 1,000 $\mu$m, about 200 $\mu$m to about 900 $\mu$m, about 300 $\mu$m to about 700 $\mu$m, about 400 $\mu$m to about 600 $\mu$m, about 450 $\mu$m to about 550 $\mu$m, or about 474 $\mu$m.

A thirty-second embodiment which is a composition, comprises: cured geopolymer particles; and a particulate cementitious material; wherein the cured geopolymer particles and the particulate cementitious material are a mixed blend.

A thirty-third embodiment which is the composition of the thirty-second embodiment, wherein the particulate cementitious material comprises a pozzolanic material selected from the group consisting of Trass flour, recycled glass, fly ash, bottom ash, cenospheres, glass bubbles, slag, clays, calcined clays, partially calcined clays, kaolinite clays, lateritic clays, illite clays, crystalline silica, silica flour, cement kiln dust, volcanic rock, natural pozzolans, mine tailings, diatomaceous earth, zeolite, shale, ground vitrified pipe, agricultural waste ash, ground granulated blast furnace slag, bentonite, pumice, and any combination thereof.

A thirty-fourth embodiment which is the composition of the thirty-second embodiment or the thirty-third embodiment, wherein the particulate cementitious material comprises an additive selected from the group consisting of quartz flour, bulk flow enhancer, aggregate, particulate material, filler, and any combination thereof.

A thirty-fifth embodiment which is the composition of any of the thirty-second embodiment to the thirty-fourth embodiment, wherein the particulate cementitious material comprises a Portland cement, a volcanic rock, a fly ash, or any combination thereof.

A thirty-sixth embodiment which is the composition of any of the thirty-second embodiment to the thirty-fifth embodiment, wherein the composition is a low Portland cement blend.

A thirty-seventh embodiment which is the composition of the thirty-sixth embodiment, wherein the low Portland cement blend comprises less than about 50 percent, by weight, the Portland cement.

A thirty-eighth embodiment which is the composition of any of the thirty-second embodiment to the thirty-seventh embodiment, wherein the composition, optionally comprising a dry blend, has a moisture content less than about 1,000 parts per million by weight (ppmw), about 900 ppmw, about 800 ppmw, about 700 ppmw, about 600 ppmw, about 500 ppmw, about 400 ppmw, about 300 ppmw, about 200 ppmw, about 100 ppmw, about 10 ppmw, about 1 ppmw, or about 0.1 ppmw of water.

A thirty-ninth embodiment which is the composition of any of the thirty-second embodiment to the thirty-eighth embodiment, wherein the cured geopolymer particles have a particle size of about 0.1 nanometer (nm) to about 1,000 nm, 0.1 nm to about 100 nm, about 1 to about 100 nm, about 5 to about 100 nm, about 10 to about 100 nm, about 10 to about 20 nm, about 20 to about 30 nm, about 30 nm to about 40 nm, about 40 nm to about 50 nm, about 50 nm to about 60 nm, about 60 nm to about 70 nm, about 70 to about 80 nm, about 80 nm to about 90 nm, or about 90 nm to about 100 nm.

A fortieth embodiment which is the composition of any of the thirty-second embodiment to the thirty-ninth embodiment, wherein the cured geopolymer particles have a particle size of about 1 micron ($\mu$m) to about 1,000 $\mu$m, about 1 $\mu$m to about 600 $\mu$m, about 1 $\mu$m to about 100 $\mu$m, about 3 $\mu$m to about 100 $\mu$m, about 5 $\mu$m to about 100 $\mu$m, about 8 $\mu$m to about 100 $\mu$m, about 10 $\mu$m to about 100 $\mu$m, about 15 $\mu$m to about 50 $\mu$m, about 10 $\mu$m to about 20 $\mu$m, about 20 $\mu$m to about 30 $\mu$m, about 30 $\mu$m to about 40 $\mu$m, about 40 $\mu$m to about 50 $\mu$m, about 50 $\mu$m to about 60 $\mu$m, about 60 $\mu$m to about 70 $\mu$m, about 70 $\mu$m to about 80 $\mu$m, about 80 $\mu$m to about 90 $\mu$m, or about 90 $\mu$m to about 100 $\mu$m.

A forty-first embodiment which is the composition of any of the thirty-second embodiment to the fortieth embodiment, wherein the cured geopolymer particles comprise an aluminosilicate with a molar ratio of $SiO_2$ to $Al_2O_3$ of about 5.0:1.0 to about 1.0:2:0; about 2.5:1.0 to about 1.0:2.0, or about 2.2:1.0 to about 1.0:1.0.

A forty-second embodiment which is the composition of any of the thirty-second embodiment to the forty-first embodiment, wherein the cured geopolymer particles comprise about 1 weight percent (wt. %) to about 70 wt. %, 5 weight percent to about 70 wt. %, about 10 wt. % to about 60 wt. %, about 10 wt. % to about 50 wt. %, about 20 wt. % to about 50 wt. %, about 30 wt. % to about 50 wt. %, about 40 wt. % to about 50 wt. %, about 41 wt. % to about 50 wt. %, about 42 wt. % to about 50 wt. %, about 43 wt. % to about 50 wt. %, about 44 wt. % to about 50 wt. %, about 45 wt. % to about 50 wt. %, about 46 wt. % to about 50 wt. %, about 47 wt. % to about 50 wt. %, about 48 wt. % to about 50 wt. %, about 49 wt. % to about 50 wt. %, about 49 wt. % to about 51 wt. %, about 49 wt. % to about 52 wt. %, about 49 wt. % to about 53 wt. %, about 49 wt. % to about 54 wt. %, or about 49 wt. % to about 55 wt. %, based on the total weight of the composition.

A forty-third embodiment which is the composition of any of the thirty-second embodiment to the forty-second embodiment, wherein each of the cured geopolymer particles, comprises: an aluminosilicate; a metal hydroxide; and a metal silicate.

A forty-fourth embodiment which is the composition of the forty-third embodiment, wherein the metal hydroxide comprises sodium hydroxide and the metal silicate comprises sodium silicate.

A forty-fifth embodiment which is the composition of any of the thirty-second embodiment to the forty-fourth embodiment, wherein the cured geopolymer particles are not calcined.

A forty-sixth embodiment which is the composition of any of the thirty-second embodiment to the forty-fifth embodiment, wherein a precursor of the cured geopolymer particles comprising geopolymer particles is not calcined.

A forty-seventh embodiment which is the composition of any of the thirty-second embodiment to the forty-sixth embodiment, wherein each of the cured geopolymer particles is made by: contacting an aluminosilicate, a metal hydroxide, a metal silicate, and water to form a mixture; curing the mixture at about 140° C. to about 600° C. for at least about 48 hours to obtain a cured geopolymer, and reducing a size of the cured geopolymer to obtain cured geopolymer particles, by optionally grinding the cured geopolymer to obtain the cured geopolymer particles.

A forty-eighth embodiment which is a method of making a mixed particulate blend, comprises: contacting cured geopolymer particles and a particulate cementitious material to form the mixed particulate blend.

A forty-ninth embodiment which is the method of the forty-eighth embodiment, wherein the particulate cementitious material comprises a Portland cement, and the cured geopolymer particles comprise an aluminosilicate, a metal hydroxide, and a metal silicate.

A fiftieth embodiment which is the method of the forty-ninth embodiment, wherein the metal hydroxide comprises sodium hydroxide and the metal silicate comprises sodium silicate.

A fifty-first embodiment which is the method of any of the forty-eighth embodiment to the fiftieth embodiment, wherein the cured geopolymer particles are not calcined.

A fifty-second embodiment which is the method of any of the forty-eighth embodiment to the fifty-first embodiment, wherein a precursor of the cured geopolymer particles is not calcined.

A fifty-third embodiment which is the method of any of the forty-eighth embodiment to the fifty-second embodiment, wherein the cured geopolymer particles are made by a process comprising: contacting an aluminosilicate, a metal hydroxide, a metal silicate, and water to form a mixture; curing the mixture at about 100° C. to about 600° C., about 110° C. to about 500° C. about 120° C. to about 180° C., about 130° C. to about 160° C., or about 140° C. for at least about 24 hour (hr), at least about 48 hr, at least about 72 hr, or about 24 hr to about 120 hr to obtain a cured geopolymer; and reducing a size of the cured geopolymer to obtain cured geopolymer particles, by optionally grinding the cured geopolymer to obtain the cured geopolymer particles.

A fifty-fourth embodiment which is a wellbore servicing fluid comprises the composition of the thirty-second embodiment and an aqueous fluid.

A fifty-fifth embodiment which is the wellbore servicing fluid of the fifty-fourth embodiment, wherein the wellbore servicing fluid comprises about 10% to about 110%, about 10% to about 110%, about 20% to about 100%, about 30% to about 100%, about 40% to about 100%, about 50% to about 100%, about 60% to about 100%, about 70% to about 100%, about 80% to about 100%, or about 90% to about 100% cured geopolymer particles by weight of the blend excluding the cured geopolymer particles (BWOB-ECGP).

A fifty-sixth embodiment which is the wellbore servicing fluid of the fifty-fourth embodiment or fifty-fifth embodiment, wherein the particulate cementitious material comprises another pozzolanic material.

A fifty-seventh embodiment which is the wellbore servicing fluid of the fifty-sixth embodiment, wherein the another pozzolanic material comprises Trass flour, recycled glass, fly ash, bottom ash, cenospheres, glass bubbles, slag, clays, calcined clays, partially calcined clays, kaolinite clays, lateritic clays, illite clays, crystalline silica, silica flour, cement kiln dust, volcanic rock, natural pozzolans, mine tailings, diatomaceous earth, zeolite, shale, ground vitrified pipe, agricultural waste ash, ground granulated blast furnace slag, bentonite, pumice, or any combinations thereof.

A fifty-eighth embodiment which is the wellbore servicing fluid of the fifty-sixth embodiment or fifty-seventh embodiment, wherein the pozzolanic material comprises volcanic rock, fly ash, or any combination thereof.

A fifty-ninth embodiment which is the wellbore servicing fluid of any of the fifty-fourth embodiment to the fifty-eighth embodiment, further comprising a suspension agent.

A sixtieth embodiment which is the wellbore servicing fluid of the fifty-ninth embodiment, wherein the suspension agent comprises a crosslinked guar, monoethylene glycol (MEG), a viscosifier, or any combination thereof.

A sixty-first embodiment which is the wellbore servicing fluid of any of the fifty-fourth embodiment to the sixtieth embodiment, wherein the aqueous fluid comprises fresh water, salt water, brine, a produced water, a surface water, or any combination thereof.

A sixty-second embodiment which is the wellbore servicing fluid of any of the fifty-fourth embodiment to the sixty-first embodiment, wherein the wellbore servicing fluid has an apparent viscosity of less than about 1,500 cP, or less than about 1,400 cP, as measured by a Fann® Model Rheo VADR with FYSA attachment in accordance with test standard API-RP-10B-2.

A sixty-third embodiment which is the wellbore servicing fluid of any of the fifty-fourth embodiment to the sixty-second embodiment, wherein the wellbore servicing fluid has an apparent viscosity of about 200 cP to about 400 cP as measured by a Fann® Model RheoVADR with FYSA attachment in accordance with test standard API-RP-10B-2, at a shear rate of about 50 to about 1,200 per second in a substantially laminar flow for transporting loss circulation materials.

A sixty-fourth embodiment which is a method for making a wellbore servicing fluid comprises: contacting cured geopolymer particles and a particulate cementitious material to form a composition, optionally comprising a dry blend; and contacting the composition with an aqueous fluid to form a wellbore servicing fluid.

A sixty-fifth embodiment which is the method of the sixty-fourth embodiment, wherein the aqueous fluid comprises fresh water, salt water, brine, a produced water, a surface water, or any combination thereof.

A sixty-sixth embodiment which is the method of the sixty-fourth embodiment or sixty-fifth embodiment, wherein the wellbore servicing fluid has an apparent viscosity of less than about 1,500 cP, or less than about 1,400 cP.

A sixty-seventh embodiment which is the method of any of the sixty-fourth embodiment to the sixty-sixth embodiment, wherein contacting the composition with an aqueous fluid further comprises blending at about 1,000 rpm to about 20,000 rpm, about 2,000 rpm to about 15,000 rpm, or about 4,000 rpm to about 12,000 rpm for about 10 to about 60 seconds.

A sixty-eighth embodiment which is the method of any of the sixty-fourth embodiment to the sixty-seventh embodiment, further comprising conditioning at about 4° C. to about 50° C., about 16° C. to about 38° C., or about 27° C. (80° F.) for about 1 minute (min) to about 60 min, about 20 min to about 40 min, or about 30 min.

A sixty-ninth embodiment which is the method of any of the sixty-fourth embodiment to the sixty-eighth embodiment, wherein the wellbore servicing fluid comprises about 10% to about 110%, about 10% to about 100%, about 20% to about 100%, about 30% to about 100%, about 40% to about 100%, about 50% to about 100%, about 60% to about 100%, about 70% to about 100%, about 80% to about 100%, or about 90% to about 100% cured geopolymer particles BWOB.

A seventieth embodiment which is the method of any of the sixty-fourth embodiment to the sixty-ninth embodiment, wherein the wellbore servicing fluid has an apparent viscosity of about 200 cP to about 400 cP, as measured by a Fann® Model RheoVADR with FYSA attachment in accordance with test standard API-RP-10B-2, at a shear rate of about 50 to about 1,200 per second in a substantially laminar flow for transporting loss circulation materials.

A seventy-first embodiment which is the method of any of the sixty-fourth embodiment to the seventieth embodiment, wherein each of the cured geopolymer particles has a $D_{50}$ particle size of about 1 micron ($\mu m$) to about 1,000 $\mu m$, about 10 $\mu m$ to about 800 $\mu m$, about 20 $\mu m$ to about 700 $\mu m$, about 30 $\mu m$ to about 600 $\mu m$, about 30 $\mu m$ to about 500 $\mu m$, about 30 $\mu m$ to about 300 $\mu m$, about 30 $\mu m$ to about 200 $\mu m$, about 80 $\mu m$ to about 180 $\mu m$, about 120 $\mu m$ to about 160 $\mu m$, or about 162 $\mu m$.

A seventy-second embodiment which is the method of any of the sixty-fourth embodiment to the seventy-first embodiment, wherein each of the cured geopolymer particles has a $D_{10}$ particle size of about 1 $\mu m$ to about 100 $\mu m$, about 10 $\mu m$ to about 80 $\mu m$, about 20 $\mu m$ to about 60 $\mu m$, about 30 $\mu m$ to about 40 $\mu m$, or about 33.9 $\mu m$.

A seventy-third embodiment which is the method of any of the sixty-fourth embodiment to the seventy-second embodiment, wherein each of the cured geopolymer particles has a $D_{90}$ particle size of 100 $\mu m$ to about 1,000 $\mu m$, about 200 $\mu m$ to about 900 $\mu m$, about 300 $\mu m$ to about 700 $\mu m$, about 400 $\mu m$ to about 600 $\mu m$, about 450 $\mu m$ to about 550 $\mu m$, or about 474 $\mu m$.

A seventy-fourth embodiment which is the method of any of the sixty-seventh embodiment to the seventy-third embodiment, further comprising allowing the wellbore servicing fluid to set, wherein the wellbore servicing fluid sets in about 35%, about 30%, or about 25% less time than an otherwise identical wellbore servicing fluid absent the cured geopolymer particles at a set time of about 50 psi, about 200 psi, about 250 psi, or about 500 psi, as measured for compressive strength by an Ultrasonic Cement Analyzer (UCA).

A seventy-fifth embodiment which is the method of the seventy-fourth embodiment, wherein the set time can be at about 12 hours, about 24 hours, about 36 hours, about 48 hours, about 60 hours, or about 72 hours.

A seventy-sixth embodiment which is the method of the seventy-fifth embodiment, wherein the wellbore servicing fluid sets in about 30 hours at about 250 psi.

A seventy-seventh embodiment which is the method of the seventy-sixth embodiment, wherein the wellbore servicing fluid sets at a bottom hole static temperature of about 10° C. to about 60° C. (140° F.), about 10° C. to about 55° C., about 10° C. to about 50° C., about 10° C. to about 45° C., or about 10° C. to about 40° C.

A seventy-eighth embodiment which is a wellbore servicing fluid, comprises: cured geopolymer particles; a particulate cementitious material; and an aqueous fluid.

A seventy-ninth embodiment which is the wellbore servicing fluid of the seventy-eighth embodiment, wherein the particulate cementitious material comprises a Portland cement.

An eightieth embodiment which is the wellbore servicing fluid of the seventy-eighth embodiment or seventy-ninth embodiment, wherein the composition has a moisture content less than about 1,000, about 900, about 800, about 700, about 600, about 500, about 400, about 300, about 200, about 100, about 10, about 1, or about 0.1 ppm of the aqueous fluid.

An eighty-first embodiment which is the wellbore servicing fluid of any of the seventy-eighth embodiment to the eightieth embodiment, wherein the cured geopolymer particles have a particle size of about 0.1 nm to about 100 nm, about 1 to about 100 nm, about 5 to about 100 nm, about 10 to about 100 nm, about 10 to about 20 nm, about 20 to about 30 nm, about 30 nm to about 40 nm, about 40 nm to about 50 nm, about 50 nm to about 60 nm, about 60 nm to about 70 nm, about 70 to about 80 nm, about 80 nm to about 90 nm, or about 90 nm to about 100 nm.

An eighty-second embodiment which is the wellbore servicing fluid of any of the seventy-eighth embodiment to the eighty-first embodiment, wherein the cured geopolymer particles have a particle size of about 1 $\mu m$ to about 1,000 $\mu m$, about 1 $\mu m$ to about 600 $\mu m$, about 1 $\mu m$ to about 100 $\mu m$, about 3 $\mu m$ to about 100 $\mu m$, about 5 $\mu m$ to about 100 $\mu m$, about 8 $\mu m$ to about 100 $\mu m$, about 10 $\mu m$ to about 100 $\mu m$, about 15 $\mu m$ to about 50 $\mu m$, about 10 $\mu m$ to about 20 $\mu m$, about 20 $\mu m$ to about 30 $\mu m$, about 30 $\mu m$ to about 40 $\mu m$, about 40 $\mu m$ to about 50 $\mu m$, about 50 $\mu m$ to about 60

µm, about 60 µm to about 70 µm, about 70 µm to about 80 µm, about 80 µm to about 90 µm, or about 90 µm to about 100 µm.

An eighty-third embodiment which is the wellbore servicing fluid of any of the seventy-eighth embodiment to the eighty-second embodiment, wherein the cured geopolymer particles comprises an aluminosilicate with a molar ratio of $SiO_2$ to $Al_2O_3$ of about 5.0:1.0 to about 1.0:2:0; about 2.5:1.0 to about 1.0:2.0, or about 2.2:1.0 to about 1.0:1.0.

An eighty-fourth embodiment which is the wellbore servicing fluid of any of the seventy-eighth embodiment to the eighty-third embodiment, wherein the cured geopolymer particles comprise about 1 wt. % to about 70 wt. %, 5 weight percent to about 70 wt. %, about 10 wt. % to about 60 wt. %, about 10 wt. % to about 50 wt. %, about 20 wt. % to about 50 wt. %, about 30 wt. % to about 50 wt. %, about 40 wt. % to about 50 wt. %, about 41 wt. % to about 50 wt. %, about 42 wt. % to about 50 wt. %, about 43 wt. % to about 50 wt. %, about 44 wt. % to about 50 wt. %, about 45 wt. % to about 50 wt. %, about 46 wt. % to about 50 wt. %, about 47 wt. % to about 50 wt. %, about 48 wt. % to about 50 wt. %, about 49 wt. % to about 50 wt. %, about 49 wt. % to about 51 wt. %, about 49 wt. % to about 52 wt. %, about 49 wt. % to about 53 wt. %, about 49 wt. % to about 54 wt. %, or about 49 wt. % to about 55 wt. %, based on the total weight of the mixed blend.

An eighty-fifth embodiment which is the wellbore servicing fluid of any of the seventy-eighth embodiment to the eighty-fourth embodiment, wherein each of the cured geopolymer particles, comprises: an aluminosilicate; a metal hydroxide; and a metal silicate.

An eighty-sixth embodiment which is the wellbore servicing fluid of the eighty-fifth embodiment, wherein the metal hydroxide comprises sodium hydroxide and the metal silicate comprises sodium silicate.

An eighty-seventh embodiment which is the wellbore servicing fluid of any of the seventy-eighth embodiment to the eighty-sixth embodiment, wherein the cured geopolymer particles are not calcined.

An eighty-eighth embodiment which is the wellbore servicing fluid of any of the seventy-eighth embodiment to the eighty-seventh embodiment, wherein a precursor of the cured geopolymer particles comprising geopolymer particles is not calcined.

An eighty-ninth embodiment which is the wellbore servicing fluid of any of the seventy-eighth embodiment to the eighty-eighth embodiment, wherein the aqueous fluid comprises fresh water, salt water, brine, a produced water, a surface water, or any combination thereof.

A ninetieth embodiment which is a method of servicing a wellbore penetrating a subterranean formation, comprises: placing a wellbore servicing fluid of any of the fifty-fourth embodiment to the sixty-third embodiment and the seventy-eighth embodiment to the eighty-ninth embodiment into the wellbore; and allowing the wellbore servicing fluid to form a set cement.

A ninety-first embodiment which is the method of the ninetieth embodiment, further comprising placing a first spacer fluid downhole of the wellbore servicing fluid and a second spacer fluid uphole of the wellbore servicing fluid.

A ninety-second embodiment which is the method of the ninety-first embodiment, wherein the first spacer fluid, the wellbore servicing fluid and the second spacer fluid are placed downhole during drilling to remedy a lost circulation zone.

A ninety-third embodiment which is the method of the ninety-second embodiment, wherein the first spacer fluid, the wellbore servicing fluid and the second spacer fluid are placed downhole after drilling for cementing a tubular in the wellbore.

A ninety-fourth embodiment which is a method of drilling a wellbore, comprises: preparing a wellbore servicing fluid by contacting cured geopolymer particles and a particulate cementitious material with an aqueous fluid; drilling, with a drilling fluid, at least a portion of the wellbore penetrating a subterranean formation; placing a first spacer fluid downhole; placing the wellbore servicing fluid downhole; placing a second spacer fluid downhole; moving a drill string uphole within the wellbore; allowing a sufficient period of time for the wellbore servicing fluid to set; and moving the drill string downhole within the wellbore continuing drilling.

A ninety-fifth embodiment which is a method comprises: preparing a wellbore servicing fluid by contacting cured geopolymer particles and a particulate cementitious material with an aqueous fluid; after drilling, placing the wellbore servicing fluid in a wellbore penetrating a subterranean formation; and allowing the wellbore servicing fluid to set.

A ninety-sixth embodiment which is the method of the ninety-fifth embodiment, wherein the wellbore servicing fluid is placed in an annular space formed by a conduit (e.g., casing) disposed within the wellbore.

A ninety-seventh embodiment which is a method of servicing a wellbore penetrating a subterranean formation, comprises: placing a wellbore servicing fluid comprising cured geopolymer particles; a particulate cementitious material; and an aqueous fluid into the wellbore; and allowing the wellbore servicing fluid to form a set cement.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A composition, comprising:

cured geopolymer particles, wherein the cured geopolymer particles comprise an aluminosilicate, a metal hydroxide, and a metal silicate; and a particulate cementitious material, wherein the cured geopolymer particles are cured and ground prior to contacting with the particulate cementitious material are to form a mixed blend.

2. The composition of claim 1, wherein the particulate cementitious material comprises a pozzolanic material selected from the group consisting of Trass flour, recycled glass, fly ash, bottom ash, cenospheres, glass bubbles, slag, clays, calcined clays, partially calcined clays, kaolinite clays, lateritic clays, illite clays, crystalline silica, silica flour, cement kiln dust, volcanic rock, natural pozzolans, mine tailings, diatomaceous earth, zeolite, shale, ground vitrified pipe, agricultural waste ash, ground granulated blast furnace slag, bentonite, pumice, and any combination thereof.

3. The composition of claim 1, wherein the particulate cementitious material comprises an additive selected from the group consisting of quartz flour, bulk flow enhancer, aggregate, additional cured geopolymer particles, filler, and any combination thereof.

4. The composition of claim 1, wherein the particulate cementitious material comprises a Portland cement, a volcanic rock, a fly ash, or any combination thereof.

5. The composition of claim 1, wherein the composition is a Portland cement blend.

6. The composition of claim 5, wherein the Portland cement blend comprises about 27 to about 50 percent, by weight, the Portland cement.

7. The composition of claim 1, wherein the composition has a moisture content of about 0.1 to about 1,000 parts per million by weight (ppmw).

8. The composition of claim 1, wherein the cured geopolymer particles have a particle size of about 0.1 nanometer (nm) to about 1,000 nm.

9. The composition of claim 1, wherein the cured geopolymer particles have a particle size of about 1 micron (μm) to about 1,000 μm.

10. The composition of claim 1, wherein the cured geopolymer particles comprise an aluminosilicate with a molar ratio of $SiO_2$ to $Al_2O_3$ of about 5.0:1.0 to about 1.0:2:0.

11. The composition of claim 1, wherein the cured geopolymer particles comprise about 1 weight percent (wt. %) to about 70 wt. %, based on a total weight of the composition.

12. The composition of claim 1, wherein the particulate cementitious material comprises a Portland cement.

13. The composition of claim 1, wherein the metal hydroxide comprises sodium hydroxide and the metal silicate comprises sodium silicate.

14. The composition of claim 1, wherein a precursor of the cured geopolymer particles is not calcined.

15. A method of making the composition of claim 1, comprising:

contacting the cured geopolymer particles and the particulate cementitious material to form a mixed particulate blend.

16. The method of claim 15, wherein the cured geopolymer particles are not calcined.

17. The method of claim 15, wherein the cured geopolymer particles are made by a process comprising:

contacting the aluminosilicate, the metal hydroxide, the metal silicate, and water to form a mixture; and curing the mixture at about 100° C. to about 600° C. for at least about 24 hour (hr) to obtain a cured geopolymer; and reducing a size of the cured geopolymer to obtain cured geopolymer particles.

18. A wellbore servicing fluid comprising the composition of claim 1 and an aqueous fluid.

19. The wellbore servicing fluid of claim 18, wherein the wellbore servicing fluid comprises about 10% to about 110% cured geopolymer particles by weight of the blend excluding the cured geopolymer particles (BWOB-ECGP).

20. The wellbore servicing fluid of claim 18, wherein the wellbore servicing fluid has an apparent viscosity less than about 1,500 cP, as measured by a rheometer in accordance with test standard API-RP-10B-2, at a shear rate of about 50 to about 1,200 per second in a substantially laminar flow for transporting loss circulation materials.

21. The wellbore servicing fluid of claim 18, wherein the wellbore servicing fluid has an apparent viscosity of about 200 cP to about 400 cP as measured by a rheometer in accordance with test standard API-RP-10B-2, at a shear rate of about 50 to about 1,200 per second in a substantially laminar flow for transporting loss circulation materials.

22. The wellbore servicing fluid of claim 18, further comprising allowing the wellbore servicing fluid to set, wherein the wellbore servicing fluid sets in about 25% less time than an otherwise identical wellbore servicing fluid absent the cured geopolymer particles at a set time of about 50 psi as measured for compressive strength by an Ultrasonic Cement Analyzer (UCA).

23. The wellbore servicing fluid of claim 18, wherein the wellbore servicing fluid sets at a bottom hole static temperature of about 10° C. to about 60° C.

24. A method of servicing a wellbore penetrating a subterranean formation, comprising:

placing the wellbore servicing fluid of claim 18 into the wellbore; and allowing the wellbore servicing fluid to form a set cement.

\* \* \* \* \*